US012784553B2

(12) United States Patent
Yu et al.

(10) Patent No.: US 12,784,553 B2
(45) Date of Patent: Nov. 3, 2026

(54) ELECTRONIC DOOR CHIME

(71) Applicant: NICOR LLC, Albuquerque, NM (US)

(72) Inventors: Jiabin Yu, Zhongshan City (CN); Qiang Hong, Jiangmen City (CN)

(73) Assignee: LAW IP LLC, Albuquerque, NM (US)

( * ) Notice: Subject to any disclaimer, the term of this patent is extended or adjusted under 35 U.S.C. 154(b) by 0 days.

(21) Appl. No.: 18/848,700

(22) PCT Filed: Mar. 22, 2023

(86) PCT No.: PCT/US2023/015951
§ 371 (c)(1),
(2) Date: Sep. 19, 2024

(87) PCT Pub. No.: WO2023/183419
PCT Pub. Date: Sep. 28, 2023

(65) Prior Publication Data

US 2025/0232650 A1 Jul. 17, 2025

Related U.S. Application Data

(60) Provisional application No. 63/322,326, filed on Mar. 22, 2022.

(51) Int. Cl.
*G08B 3/10* (2006.01)

(52) U.S. Cl.
CPC .................................... *G08B 3/10* (2013.01)

(58) Field of Classification Search
None
See application file for complete search history.

(56) References Cited

U.S. PATENT DOCUMENTS

| | | | | |
|---|---|---|---|---|
| 1,875,224 A * | 8/1932 | Despard | H02G 3/123 174/53 |
| 2010/0032180 A1* | 2/2010 | Korcz | H02G 3/126 174/50 |
| 2014/0179821 A1* | 6/2014 | Morizur | C08G 64/14 522/42 |
| 2018/0077391 A1* | 3/2018 | Siminoff | H02G 3/081 |
| 2020/0302757 A1 | 9/2020 | Lawrence et al. | |
| 2022/0270450 A1* | 8/2022 | Murphy | G02B 27/0994 |

OTHER PUBLICATIONS

International Search Report and Written Opinion, International Patent Application No. PCT/US2023/015951, Aug. 28, 2023, 10 pgs.

* cited by examiner

*Primary Examiner* — Thomas S Mccormack
(74) *Attorney, Agent, or Firm* — LOZA & LOZA, LLP; Kevin L. Soules

(57) ABSTRACT

An electronic door chime can meet safety standards and be compatible with doorbells. A new electronic door chime can safely powered doorbells and can be configured in a single gang box, while also being compatible with simple push button doorbell devices. A new electronic door chime can safely provide continuous power to smart doorbells, also called IOT doorbells, to drive the cameras, audio interface and other components within the smart doorbell. The new door chime complies with safety standards and can be configured in a single gang box. The disclosed systems include a separation board, to comply with UL voltage separation requirements, and the disclosed embodiments can fit into standard single gang box flush to a wall.

20 Claims, 24 Drawing Sheets

ELECTRONIC DOOR CHIME

CROSS REFERENCE TO RELATED APPLICATIONS

This patent application claims the priority and benefit under 35 U.S.C. § 119(e) of U.S. Provisional Patent Application Ser. No. 63/322,326 filed Mar. 22, 2022, entitled "ELECTRONIC DOOR CHIME." U.S. Provisional Patent Application Ser. No. 63/322,326 is herein incorporated by reference in its entirety.

TECHNICAL FIELD

Embodiments are generally related to consumer electronics. Embodiments are also related to doorbells and door chimes. Embodiments are further related to electronic doorbells and door chimes. Embodiments also relate to doorbell and door chime installation.

BACKGROUND

Prior art doorbell design is antiquated. Old doorbells had a transformer, a switch (doorbell), and a sonic transducer (chime, ringer, or buzzer). Closing the switch completed the circuit powering the sonic transducer. Some doorbells have been upgraded with electronic door chimes. Electronic door chimes can be powered, similar to the mechanical ringers of old, when the switch is closed, and the electronic door chime receives power. An advantage of electronic door chimes is that they can generate more, and different doorbell sounds and have been cost effective replacements for broken mechanical ringers.

IOT devices are internet connected sensors and actuators. An IOT doorbell can trigger a message to a person's smart phone or other internet connected device. Some IOT doorbells now include security cameras allowing a person to remotely monitor the happenings outside their door. As many people have discovered, these IOT doorbells are not always compatible with existing doorbells.

FIGS. 1 and 2, labeled as prior art, illustrate an electronic door chime that has enjoyed wide market acceptance and bears "UL" markings because it has been assessed as safe by UL, formerly Underwriters Laboratories. Those practiced in consumer electronics and product development know that an electronic door chime lacking UL certifications will not be approved for sale by most U.S. retailers or for installation by licensed contractors or home builders. UL 94 and UL 746 specify testing protocols and the classifications that may be applied to plastic materials.

UL 746 testing can establish "RTI" (Relative Temperature Index") ratings for materials. RTI is the maximum service temperature for a material where a class of critical properties will not be unacceptably compromised through chemical thermal degradation. This spans over the reasonable life of an electrical product relative to a reference material having a confirmed, acceptable corresponding performance defined RTI. RTI electrical is electrical RTI and is associated with critical electrical insulating properties. RTI impact is mechanical impact RTI and is associated with critical impact resistance, resilience, and flexibility properties. RTI strength is mechanical strength RTI or mechanical without impact and is associated with critical mechanical strength where impact resistance, resilience and flexibility are not essential. Those familiar with product certifications are familiar with RTI electrical, RTI impact, and RTI strength.

There are 12 UL 94 specified flame classifications assigned to materials based on the results of these small-scale flame tests. These classifications, listed in descending order for each of three groupings, distinguish a material's burning characteristics after test specimens have been exposed to a specified test flame under controlled laboratory conditions. The six of the classifications of interest here relate to materials commonly used in manufacturing enclosures, structural parts and insulators found in consumer electronic products (5 VA, 5 VB, V-0, V-1, V-2, HB). The classifications are listed in order from highest (most flame retardant) to lowest (least flame retardant) with 5 VA higher than 5 VB, 5 VB higher than V-0, etc.

FIG. 1, labeled as prior art, illustrates an exploded view of an electronic door chime 101. The electronic door chime 101 can be installed in a two-gang dual voltage junction box 108. The sizes of junction boxes are often specified by the number of "gangs" which is the number of standard sized wired devices the box can accommodate. As electricians know, junction box sizes have standardized sizes as specified by the National Electric Code ("NEC"). A single gang junction box is approximately 2"×4" with varying depth. A dual voltage two-gang junction box has two single-gang sections and a solid wall between the two sections to thereby isolate one section from the other.

A back piece 107 has a first compartment 127 and a second compartment 128. When installed in the dual voltage junction box, the compartments are on different sides of the solid wall with the first compartment in one section and the second compartment in the other. A transformer 106 is held in the first compartment 127 by screws 111. A circuit board 105 is held in the second compartment by screws 110. A speaker 104 in the first compartment is electrically attached to the circuit board 105. A faceplate 102 is held to the back piece 107 by screws 112 that pass through spacers 114 and thread into the faceplate 102. The spacers 114 are molded into the back piece 107. The illustrated electronic door chime 101 can be wired to two doorbell buttons 109. Two two-wire busses 113 attach the doorbell buttons 109 to the electronic door chime 101. The electronic door chime 101 can produce one sound when one of the doorbell buttons 109 is pressed and a different sound when the other doorbell button 109 is pressed.

FIG. 2, labeled as prior art, illustrates a transformer 106 and circuit board 105 in an electronic door chime 101. The spacers 114 can be seen extending into the compartments 127, 128.

The electronic door chime 101 of FIGS. 1 and 2 show a commercially successful unit at least in part because it is one of the few such devices that has surpassed safety standards and carries UL safety markings.

While these advantages are noteworthy, in order to meet the safety standards, prior art chimes must be installed in dual gang boxes. Systems and methods for electronic door chimes that are compatible with current generation IOT doorbells, and that are certified as safe for installation in single-gang boxes are needed.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is an aspect of the disclosed embodiments to provide a door chime.

It is an aspect of the disclosed embodiments to provide an electronic doorbell or door chime.

It is an aspect of the disclosed embodiments to provide an improved door chime.

It is an aspect of the disclosed embodiments to provide a safe door chime that is compatible modern electronics, that can be installed in a single-gang voltage box.

Aspects of the disclosed embodiments are further detailed herein. For example, in certain embodiments, an electronic door chime comprises a back cover comprising a first compartment and a front cover attached to the back cover to form a housing configured for installation in a voltage box. A separation board can be affixed to the back cover configured to separate the voltage box into a first and second compartment. A power supply is configured to receive mains electric power and to produce a DC output, along with a first circuit powered by the AC input, attached to the back cover, the first circuit comprising a power section, and a chiming circuit. A speaker can be held between the front cover and the first circuit, wherein the doorbell sensor is configured to receive the doorbell trigger signal and to produce a trigger sensed signal upon receiving the doorbell trigger signal and wherein the chiming circuit sends a sound signal to the speaker upon receiving the trigger sensed signal to thereby cause the speaker to produce a sound. In certain embodiment, the voltage box is a single-gang voltage box.

In an embodiment, the doorbell sensor is configured to receive a doorbell trigger signal and to produce a trigger sensed signal upon receiving the doorbell trigger signal.

In an embodiment, the chiming circuit sends a sound signal to the speaker upon receiving the trigger sensed signal to thereby cause the speaker to produce a sound. In an embodiment, the voltage box is a single-gang voltage box. In an embodiment, the separation board affixed to the housing is configured to separate the single gang box into a first compartment and a second compartment. In an embodiment, the power supply is a switching power supply circuit. In an embodiment, the electronic door chime further comprises a doorbell button, the doorbell button comprising a switch, and an indicator configured to light only when the switch is open. In an embodiment, a light emitting diode configured to light only when the switch is closed.

In another embodiment, a door chime comprises a housing configured for installation in a voltage box, a separation board affixed to the housing configured to separate a single gang voltage box into a first compartment and second compartment, a power supply, the power supply configured to receive mains electric power and to produce a DC output, a chiming circuit disposed in the housing, and a speaker disposed in the housing and operably connected to the chiming circuit. In an embodiment, the chiming circuit sends a sound signal to the speaker upon receiving a trigger sensed signal to thereby cause the speaker to produce a sound. In an embodiment, the separation board further comprises at least one breaking score. In an embodiment, the at least one breaking score is configured to allow the separation board to fit in the voltage box. In an embodiment, the first compartment accepts input lines. In an embodiment, the door chime further comprises an external doorbell button, the external doorbell button comprising a switch, and an indicator configured to light when the switch is open.

In another embodiment, a method comprises attaching a power supply to a back cover, the power supply configured to receive mains electric power and to produce an DC output, attaching a first circuit to the back cover, the first circuit comprising a power section, a doorbell interface, a doorbell sensor, and a chiming circuit, forming a housing by attaching a front cover to the back cover, the back cover comprising a separation board, and the housing configured for installation in a single-gang voltage box, receiving a doorbell trigger signal, sending a trigger sensed signal to the chiming circuit in response to receiving the doorbell trigger signal; and producing a sound wherein the chiming circuit sends a sound signal to a speaker held between the front cover and the first circuit to thereby cause the speaker to produce sounds. In an embodiment, the method comprises attaching a faceplate to the front cover, the faceplate configured to cover the housing when the housing is installed in the single gang voltage box. In an embodiment, the method comprises producing a rectified output, powering a light emitting diode from the rectified output only when a switch is open and producing the doorbell trigger signal when the switch is closed. In an embodiment, the method comprises producing a rectified output, powering a light emitting diode from the rectified output only when a switch is closed and producing the doorbell trigger signal when the switch is closed.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. The illustrated examples are nonlimiting and not necessarily to scale.

DETAILED DESCRIPTION

Figure 1:
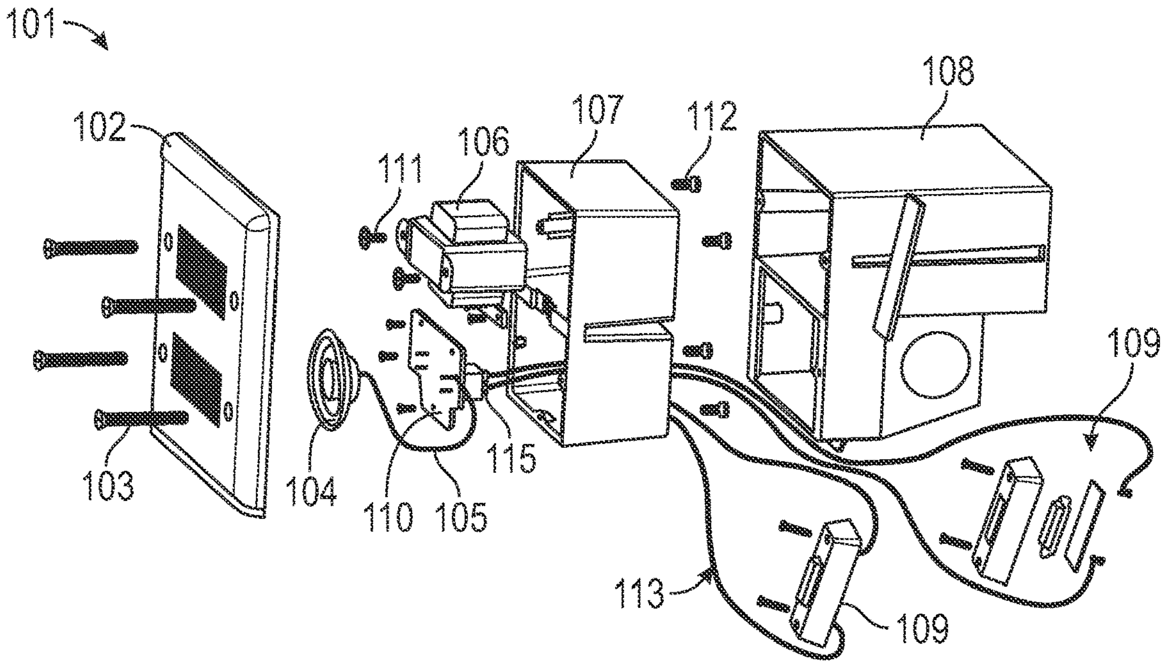
FIG. 1 (Prior Art)
FIG. 1, labeled as prior art, illustrates an exploded view of an electronic door chime.
Figure 2:
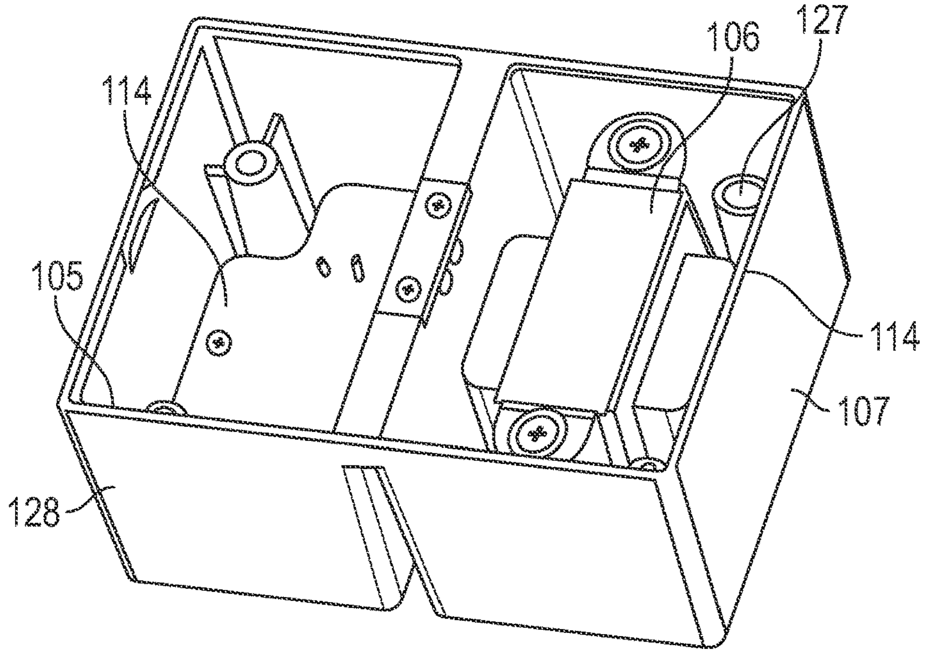
FIG. 2 (Prior Art)
FIG. 2, labeled as prior art, illustrates a transformer and circuit board in an electronic door chime.

The particular values and configurations discussed in these non-limiting examples can be varied and are cited merely to illustrate at least one embodiment and are not intended to limit the scope thereof.

Reference to the accompanying drawings, in which illustrative embodiments are shown are provided herein. The embodiments disclosed can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope and concept of the invention as defined by the appended claims.

The disclosed embodiments are directed to unique door chimes systems and kits, which can include a door chime mechanism for rendering sound and a doorbell button for triggering the sound. In certain embodiments, the systems can be configured to be compatible with "smart" doorbells, or video doorbells. The systems are further configured to be installed in a single gang wall box, offering flexible installation options, not previously available. As used herein, the term "low power" can refer to a 5 Watt configuration, and the term "high power" can refer to a 12 Watt configuration. However, in other embodiments, "low power" can further refer more generally to a lower power configuration and "high power" can refer more generally to a higher power configuration.

In an exemplary embodiment, an electronic door chime comprises a back cover comprising a first compartment, a front cover attached to the back cover to thereby form a housing configured for installation in a voltage box, a separation board affixed to the back cover configured to separate the single-gang box into a first and second compartment, a power supply, the power supply configured to receive mains electric power and to produce a DC output, a first circuit powered by the AC input, attached to the back cover, the first circuit comprising a power section, and a chiming circuit, and a speaker held between the front cover and the first circuit.

The doorbell sensor is configured to receive the doorbell trigger signal and to produce a trigger sensed signal upon receiving the doorbell trigger signal. The chiming circuit sends a sound signal to the speaker upon receiving the trigger sensed signal to thereby cause the speaker to produce a sound.

In an embodiment, the voltage box is a single-gang voltage box. The power supply can be a switching power supply circuit. In an embodiment, the system further comprises a faceplate attached to the front cover and configured to cover the electronic door chime when the housing is installed in the voltage box. The system can include an external doorbell device, the external doorbell device, or doorbell button, can comprise a rectifier, a switch, and a light emitting diode configured to light only when the switch is open as further detailed herein.

Figure 3A:
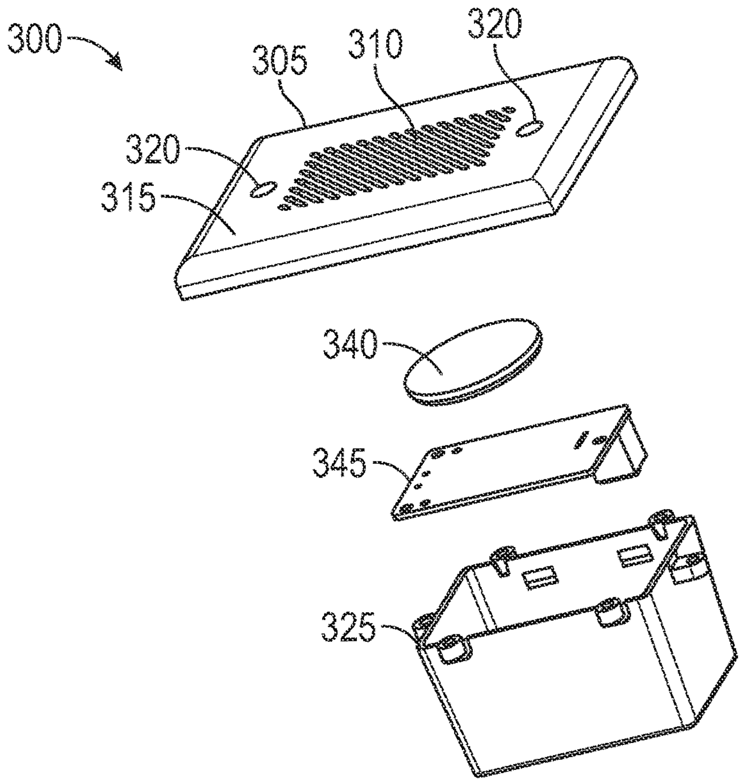
FIG. 3A provides an exploded view of an electronic door chime, in accordance with aspects of the embodiments.

FIG. 3A illustrates an exploded view of a door chime and housing system 300 configured to be installed in a single-gang box, in accordance with the disclosed embodiment. The door chime housing includes a front cover 305, with front grate 310 in the front face 315 to allow sound to exit the housing 300. The front cover 305 further includes two screw holes 320 that allow a screw to connect the front cover 305 to the remainder of the housing.

A speaker element 340, can comprise a loudspeaker or other such sound producing system, and can be configured to connect to a printed circuit board (PCB) 345 below the front cover 305. The remainder of the housing 300 includes a bottom cover 325 configured to house the PCB 345 and speaker element 340. The front cover 305 and bottom cover 325 can be joined together with any fastening means, or can be configured to snap together.

Figure 3B:
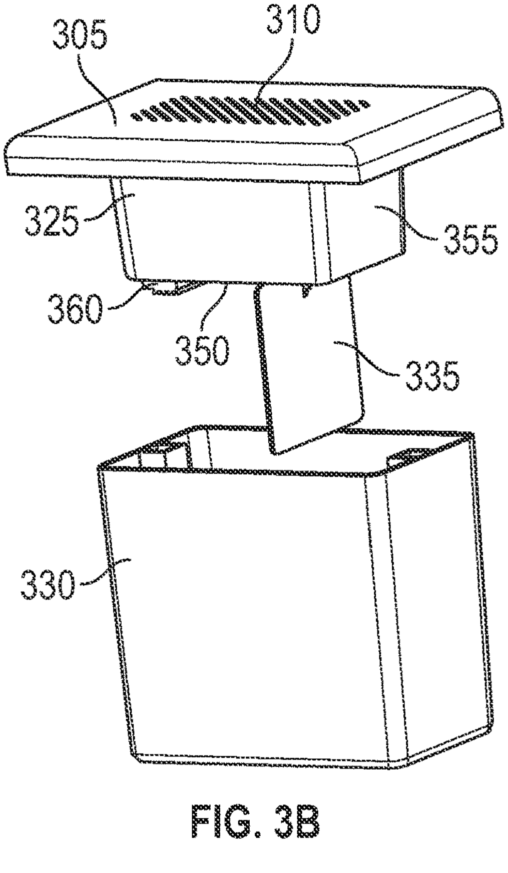
FIG. 3B illustrates an electronic door chime configured to fit in a single-gang box, in accordance with aspects of the embodiments.

FIG. 3B illustrates additional aspects and embodiments of the door chime and housing system 300. In certain embodiments, the bottom cover 325 can be designed to fit in a box 330, which can comprise a single-gang remodel voltage box, or the like. A separation board 335 can extend from the back 350 of the bottom cover 325, into the box 330. The separation board can separate the AC input (e.g., 120 VAC) side 355 of the box 330, from the output side 360 of the box 330. This constructions allows UL Class 1 and Class 2 wiring in the same wiring box, separating the high voltage and low voltage. The separation board 335 can be configured to include at least one, and potentially multiple, breaking scores 336 so that the separation board 335 can be sized to fit into different sized wiring boxes 330. The separation board can be made in accordance with the UL94 fire retardant standard.

Figure 3C:
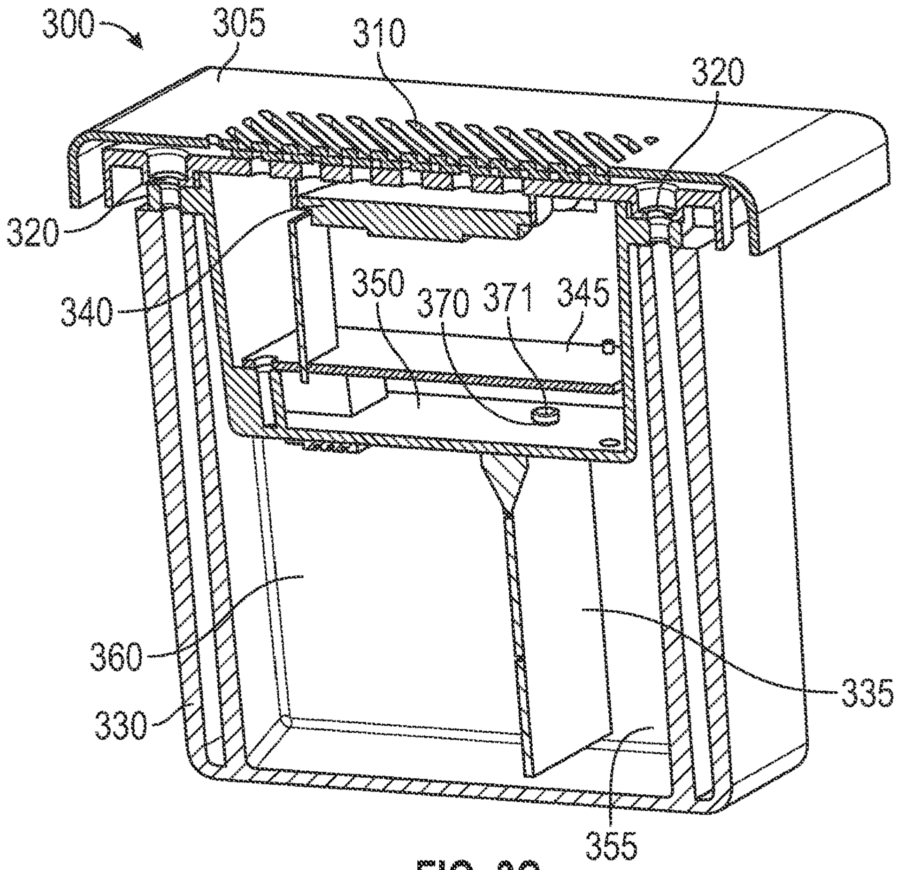
FIG. 3C illustrates an electronic door chime installed in a single-gang box, in accordance with aspects of the embodiments.
Figure 3D:
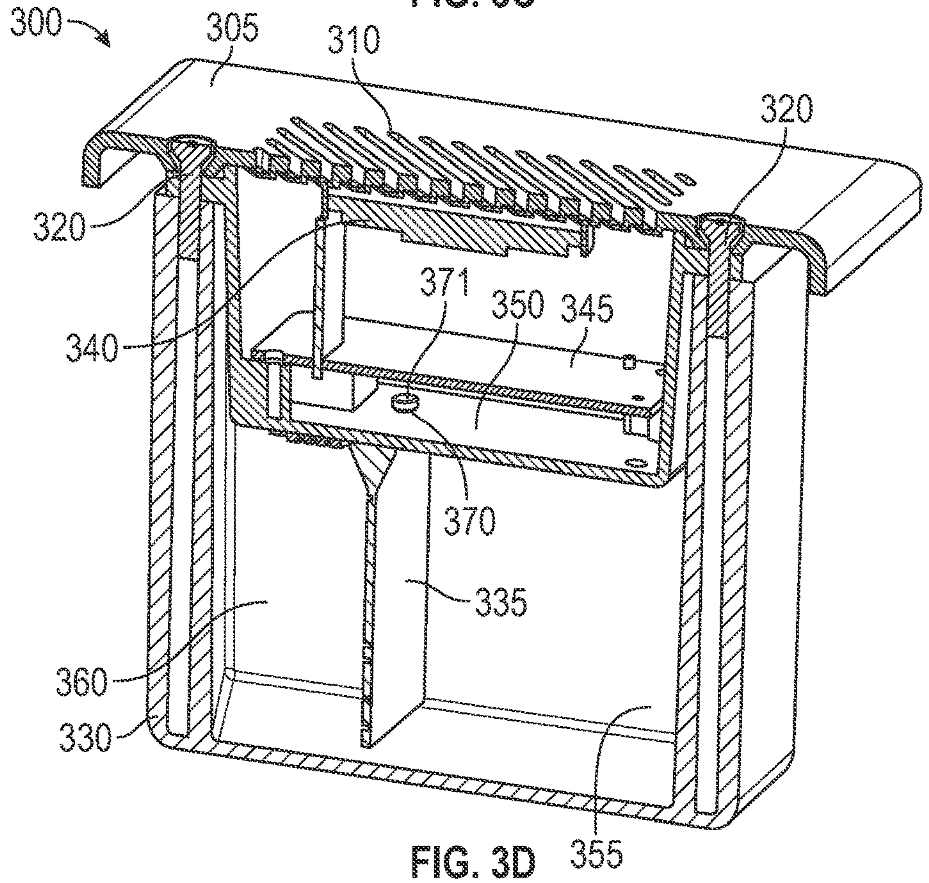
FIG. 3D illustrates another embodiment of the electronic door chime installed in a single-gang box with the separation board configured closer to the output side, in accordance with aspects of the embodiments.

FIG. 3C illustrates a cross-sectional view of a door chime and housing system 300. The bottom cover 325 can include one or more holes 370 configured to accept one or more pegs 371 attached to a separation board 335. FIG. 3D illustrates a cross-sectional view of an alternative embodiment of door chime and housing system 300. In this embodiment, the bottom cover 325 can include one or more holes 370 configured to accept one or more pegs 371 attached to a separation board 335.

It should be appreciated that the disclosed system 300 can be configured to be installed in a single gang wall box (such as box 330) as illustrated. This allows the system 300 to be installed in virtually any location including during a remodel or renovation, without the need for a dual gang, dual-voltage wall box, as is required for prior art technologies. This is made possible by, among other things, the separation board 335, which is configured to separate higher voltage input side 355 and output side 360. In FIG. 3C the separation board 335 is configured to be arranged closer to the high voltage input side 355. In FIG. 3D the separation board is configured to be arranged closer to the output side 360.

Figure 3E:
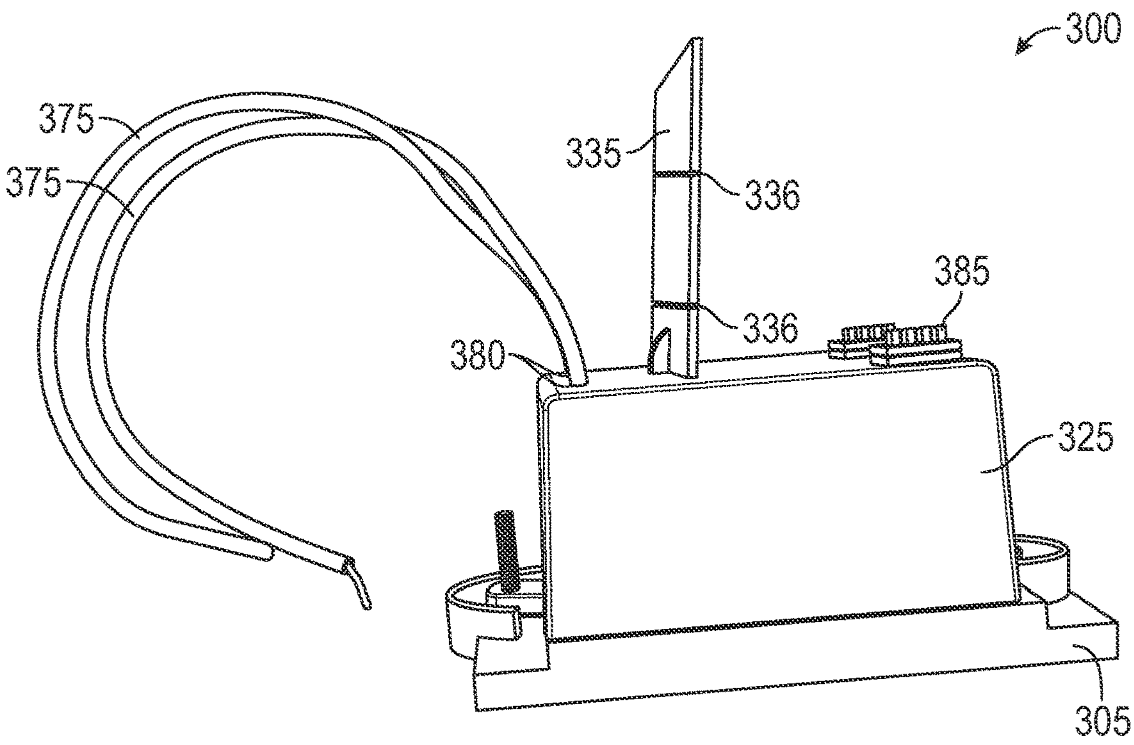
FIG. 3E illustrates a side elevation view an electronic door chime configured to fit in a single-gang box, in accordance with aspects of the embodiments.
Figure 3F:
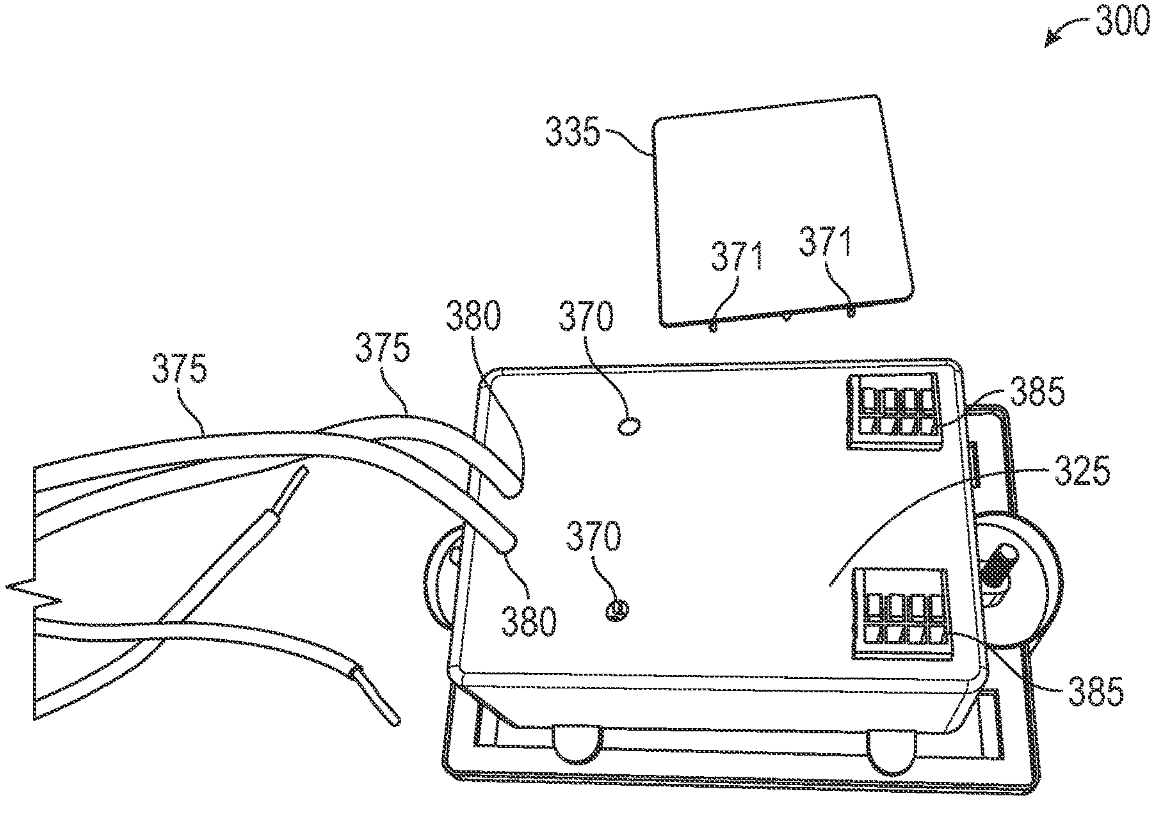
FIG. 3F illustrates a rear view of an electronic door chime configured to fit in a single-gang box, in accordance with aspects of the embodiments.

FIG. 3E and FIG. 3F illustrates further aspects of the system 300. FIG. 3C illustrates input lines 375 entering bottom cover 325 through input holes 380. Likewise, output connections 385 are illustrated on the bottom cover 325. The output connections can comprise sockets for connecting the PCB and loudspeaker to an external circuitry.

In certain embodiments, the components of the door chime can meet UL approval. For example, the conductors can be rated for the highest potential of the Class 1 circuit. Termination for the Class 2 conductors can be recessed, as shown. A UL recognized terminal block, suitable for field wiring, can be used for certain applications (e.g., a screwless type is acceptable). The connectors can comprise spring clip types with a button on each connector positioned to release the wire. In other embodiments the connections can be hard wired.

Figure 4A:
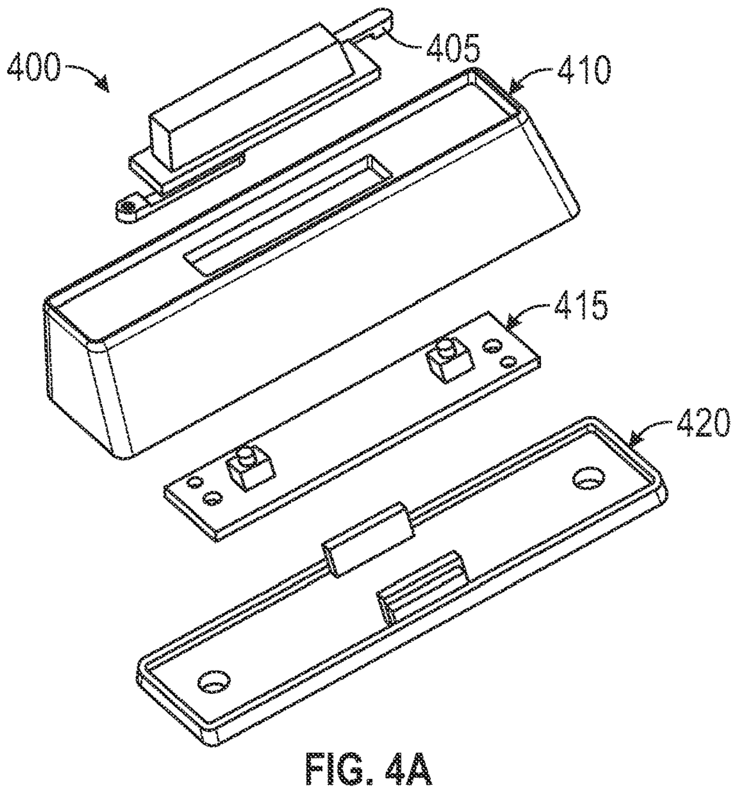
FIG. 4A illustrates a wired rectangular doorbell button, in accordance with the disclosed embodiments.

In certain embodiments, the system 300 can include a line powered doorbell button 400, as illustrated in FIG. 4A. In this embodiment, the doorbell button can include a door chime key 405 configured in a housing 410. A PCB 415 can be connected to line power. The wired button can further include a back cover 420 with two mounting holes. Schematics of associated circuits are further detailed herein.

Figure 4B:
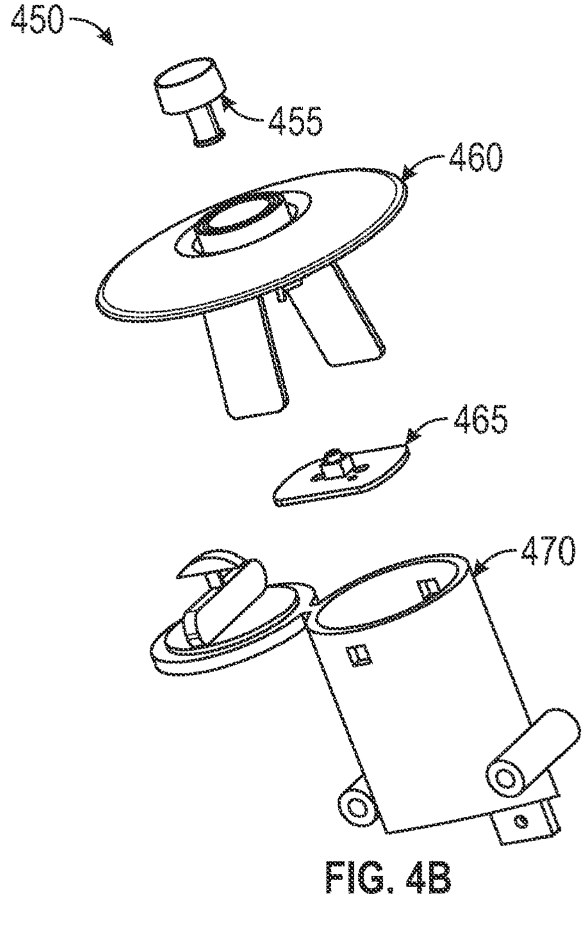
FIG. 4B illustrates a wired round doorbell button, in accordance with the disclosed embodiments.

In certain embodiment, the system 300 can include a line powered doorbell button 450, as illustrated in FIG. 4B. In this embodiment, the doorbell button can include a door chime key 455. The door chime key can comprise a round key configured to fit through a round faceplate 460. The round faceplate 460 and or the door chime key can be stylized with a desired finish. A PCB 465 can be connected to line power. The wired button can further include a housing tube 470 configured to be embedded into wall, for example, before stucco is applied to the wall.

Figure 5:
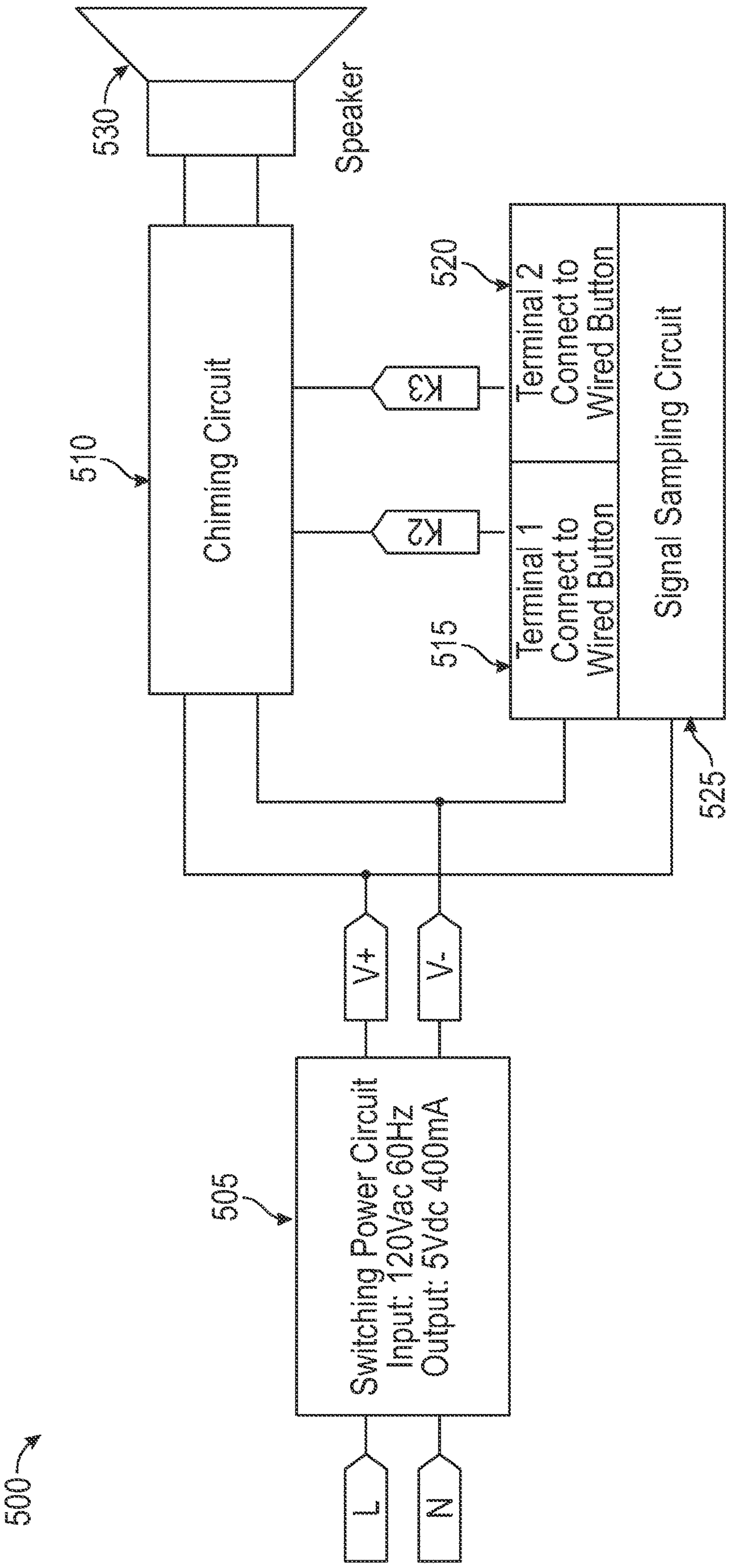
FIG. 5 illustrates a block diagram of a wired low power electronic door chime, in accordance with aspects of the embodiments.

FIG. 5 illustrates a block diagram of a low power wired chime kit 500 in accordance with the disclosed embodiments. In certain embodiments the low power wired chime kit can comprise a 5 W wired chime kit. In other embodiments, other powers are possible. The wired chime kit 500 includes a switching power supply circuit 505 operably connected to a chiming circuit 510, and two terminals, first terminal 515 and second terminal 520.

A traditional mechanical transformer is a "linear" component to the circuit, it steps down voltage for the doorbell mechanically, when there's surge from the main or caused by the doorbell's power consumption change, traditional mechanical transformer won't be able to filter or absorb surge, which may hurt or damage the doorbell. The electronic switching power supply circuit 505 can have an output of constant 24 VDC power (or other such level), which is more stable. The electronic switching power circuit 505 also provides additional protection functions including but not limited to surge protection and power limiting, as well as providing the doorbell with extra protection.

Thus, the electronic switching power supply circuit has multiple benefits to the doorbell sensor circuit. For example, it offers a more stable and safe current input to the doorbell sensor because the current input is DC instead of DC. The switching power supply protects the doorbell sensor from unexpected surges, where a traditional mechanical transformer doesn't. The switching power supply's output DC current is an impulse current due to its switching on/off working mode, the impulse DC current helps improve the doorbell sensor's temperature and life. In addition, it adds a level of safety for unusual circumstances, for example, when the doorbell's button is pressed or held for long time without being released to its normal open position.

The two terminals 515 and 520 connect to the wired button. The switching power supply circuit is further connected to a signal sampling circuit 525. The chiming circuit 510 is connected directly to the speaker 530, such that operation of the wired button results in an audible sound output by the speaker 530.

Figure 6:
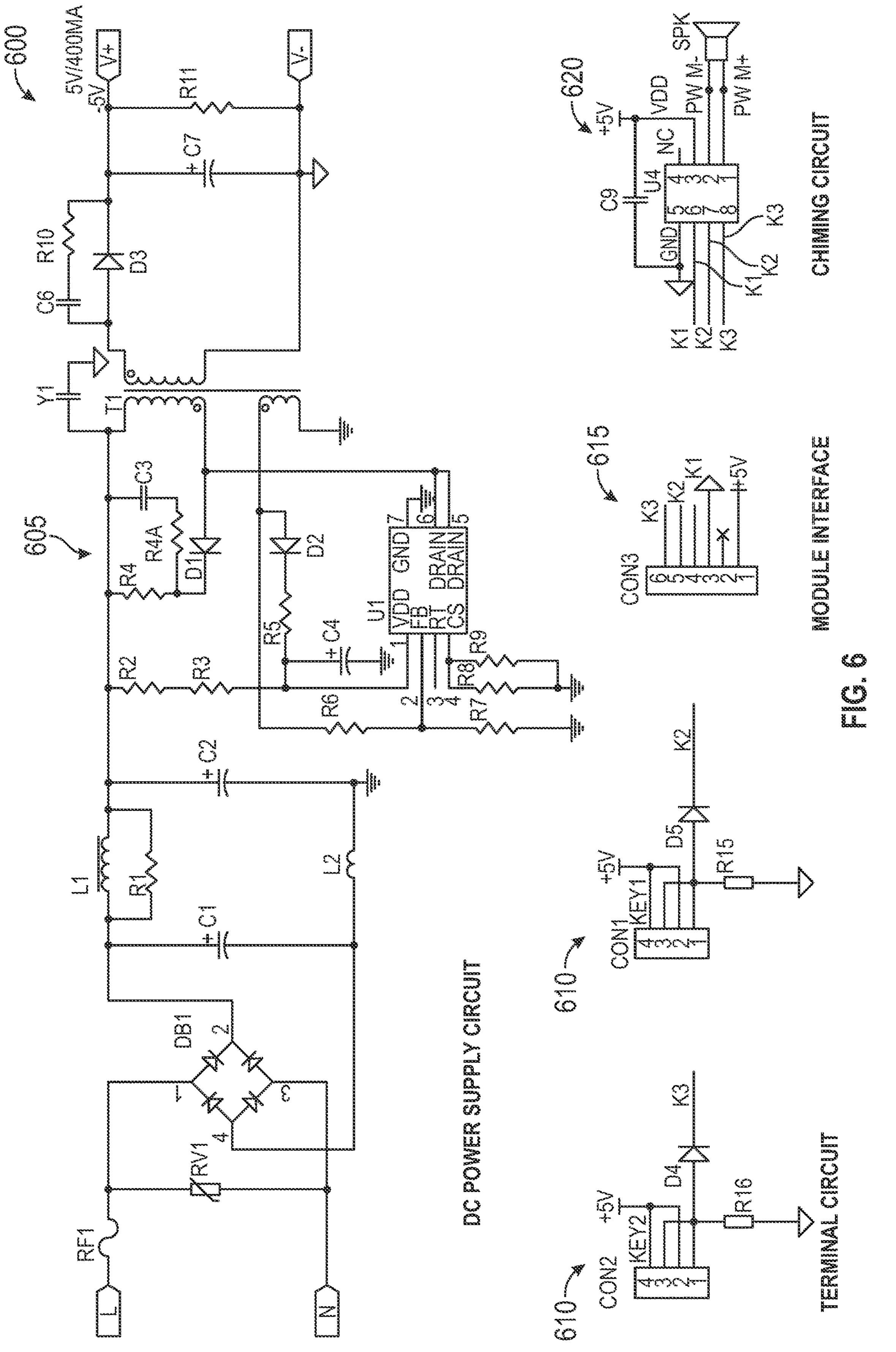
FIG. 6 illustrates a circuit schematic of a low power electronic door chime configured to fit in a single-gang box, in accordance with aspects of the embodiments.

FIG. 6 illustrates aspects of circuit assembly 600 associated with the system 300 in accordance with the disclosed embodiments. The circuits 600 can include DC power supply circuit 605, terminal circuit 610, module interface circuit 615 and chiming circuit 620. The circuit assembly 600 is configured to accept input power and a signal from an associated doorbell button (e.g., button 400 or button 450) and produce a chime sound, along with other potential applications. The circuit can be configured to accept AC input (e.g., 120V at 60 Hz), and can output a regulated DC output.

Figure 7A:
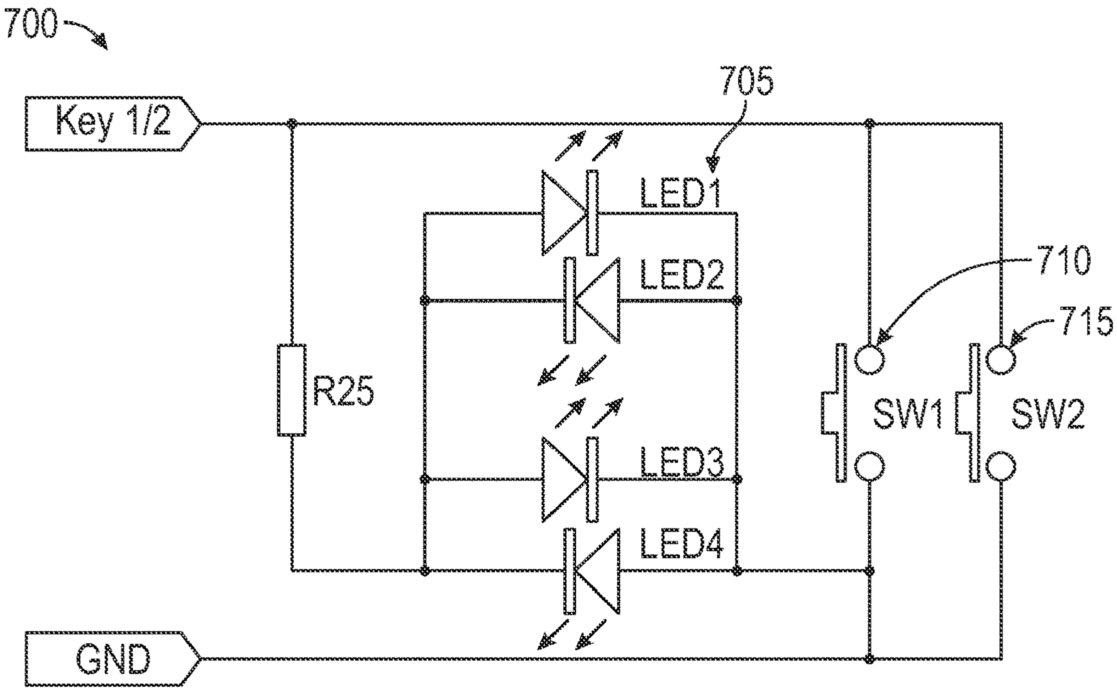
FIG. 7A illustrates a circuit schematic of a wired rectangular doorbell button for a low power chime, in accordance with aspects of the embodiments.

FIG. 7A illustrates a schematic diagram 700 of a low power button (e.g., button 400) in accordance with the disclosed embodiments. As illustrated in FIG. 7A the circuit can include multiple indicator LEDs 705 along with first switch 710 and second switch 715.

Figure 7B:
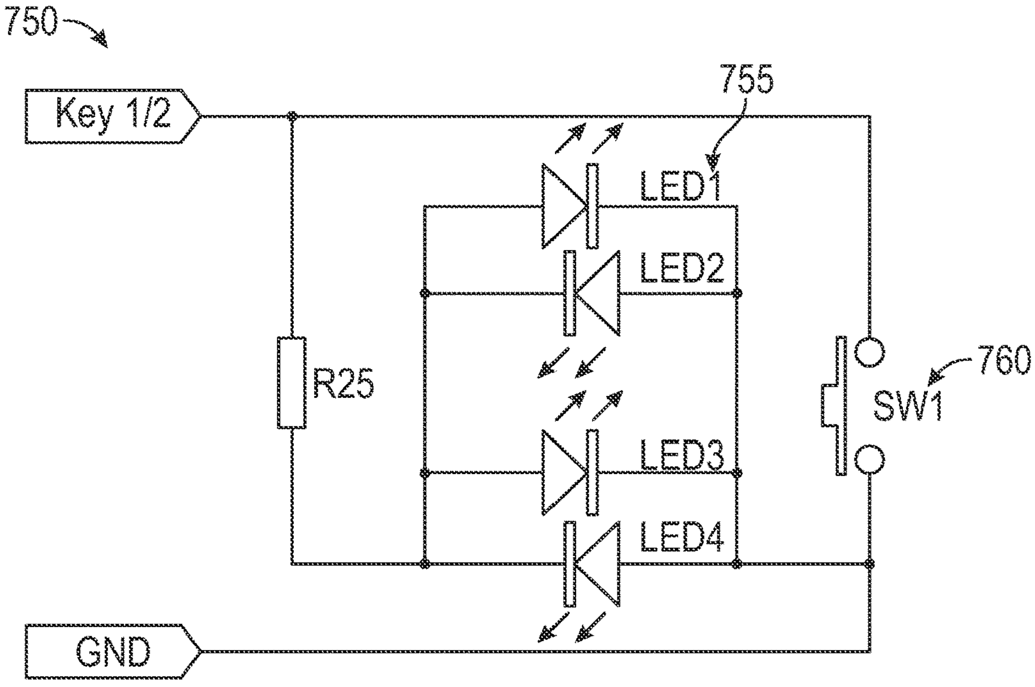
FIG. 7B illustrates a circuit schematic of wired round doorbell button for low power chime, in accordance with aspects of the embodiments.

FIG. 7B illustrates a schematic diagram 750 of a low power button (e.g., button 450) in accordance with the disclosed embodiments. As illustrated in FIG. 7B the circuit 750 can include multiple indicator LEDs 755 along with first switch 760.

Figure 8:
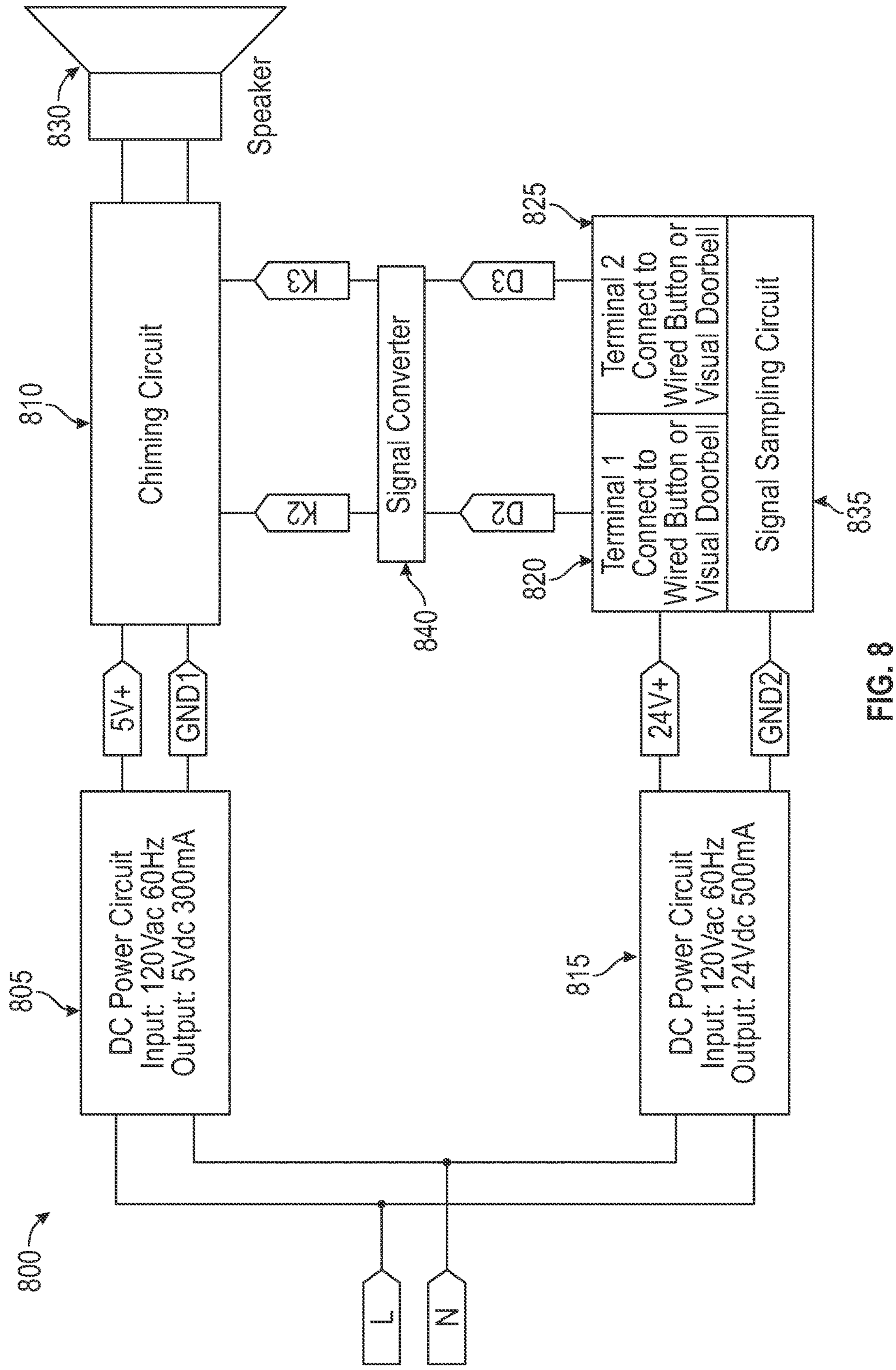
FIG. 8 illustrates a block diagram of a high power wired electronic door chime configured to fit in a single-gang box, in accordance with aspects of the embodiments.

FIG. 8 illustrates a block diagram of a high power wired chime kit 800 most commonly associated with a video doorbell, in accordance with the disclosed embodiments. The wired chime kit 800 includes a first DC power circuit 805 operably connected to a chiming circuit 810. The chiming circuit 810 is connected directly to the speaker 830, such that operation of the wired bottoms results in an audible sound output by the speaker 830.

The chime kit 800 further includes a second DC power circuit 815 connected to two terminals, first terminal 820 and second terminal 825. The two terminals 820 and 825 connect to the wired button of a visual doorbell. The DC power circuit 815 is further connected to a signal sampling circuit 835. A signal converter 840 connects the first terminal 820 to the chiming circuit 810 and the second terminal 825 to the chiming circuit 810.

Figure 9:
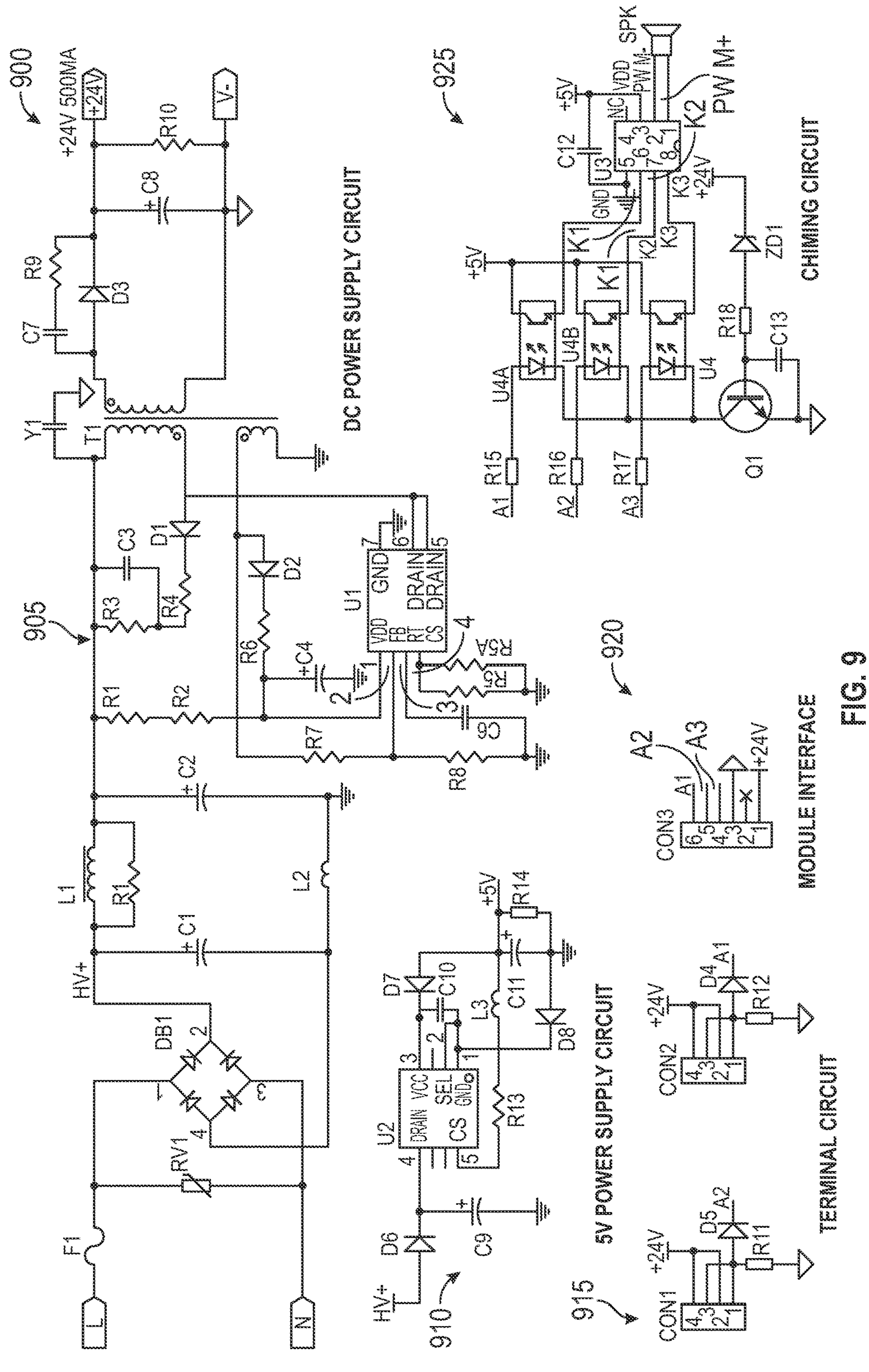
FIG. 9 illustrates a circuit schematic of a high power electronic door chime configured to fit in a single-gang box, in accordance with aspects of the embodiments.

FIG. 9 illustrates aspects of circuit assembly 900 associated with a high power wired system 300 in accordance with the disclosed embodiments. It should be understood this circuit assembly can be similarly used for a high power wireless configuration in certain embodiments. The circuits 900 can include DC power supply circuit 905, a 5V power supply circuit 910, terminal circuit 915, module interface circuit 920 and chiming circuit 925. The circuit assembly 900 is configured to accept input power and a signal from an associated doorbell button, most commonly associated with a video doorbell and produce a chime sound, along with other potential applications. The circuit can be configured to accept AC input (e.g., 120V at 60 Hz), and can output a regulated DC output.

Figure 10A:
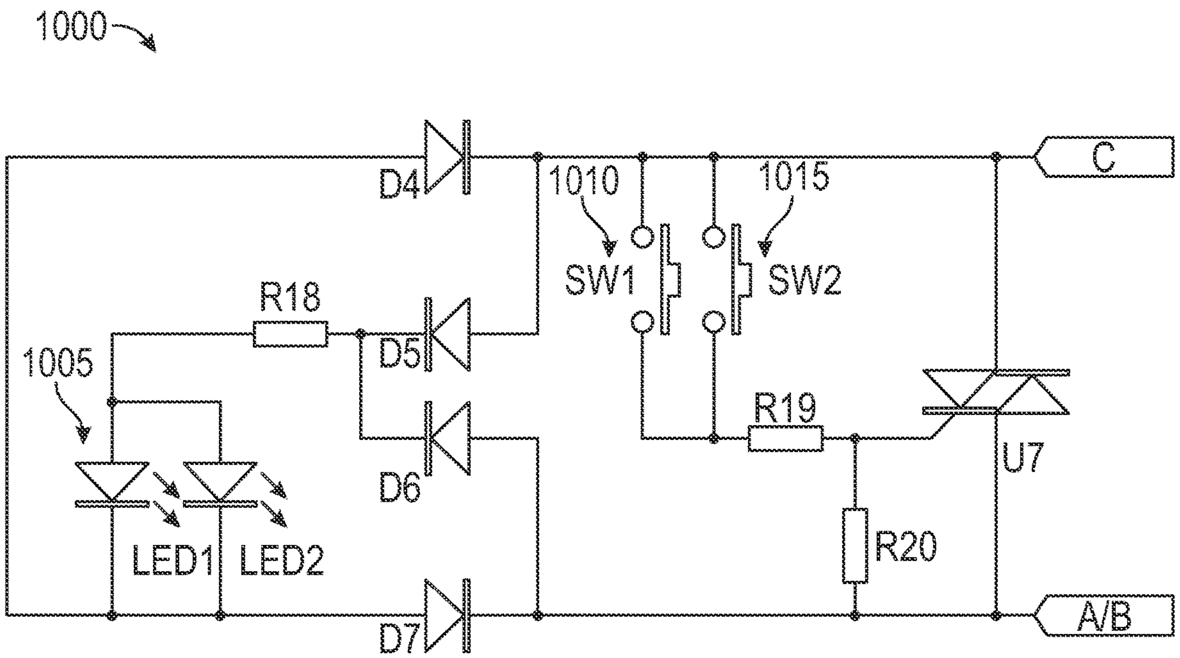
FIG. 10A illustrates a circuit schematic of a doorbell button, in accordance with aspects of the embodiments.

FIG. 10A illustrates a schematic diagram 1000 of a high power wired button (e.g., button 400) in accordance with the disclosed embodiments. As illustrated in FIG. 10A the circuit can include multiple indicator LEDs 1005 along with first switch 1010 and second switch 1015.

Figure 10B:
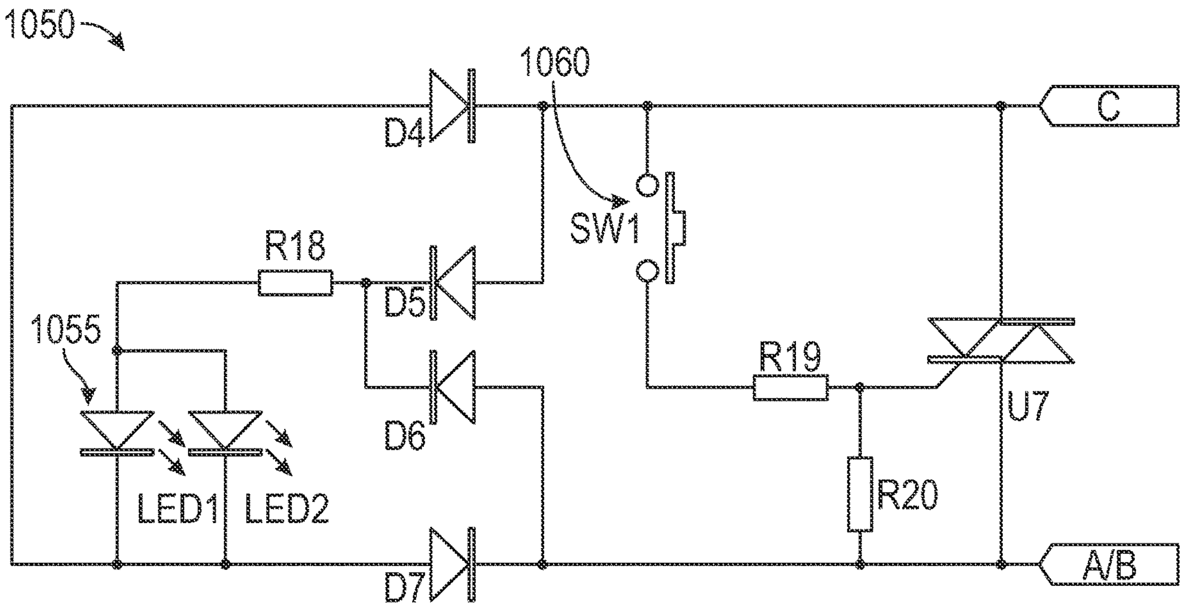
FIG. 10B illustrates a circuit schematic of a doorbell button, in accordance with aspects of the embodiments.

FIG. 10B illustrates a schematic diagram 1050 of a high power wired button (e.g., button 450) in accordance with the disclosed embodiments. As illustrated in FIG. 10B the circuit 1050 can include multiple indicator LEDs 1055 along with first switch 1060.

Figure 11:
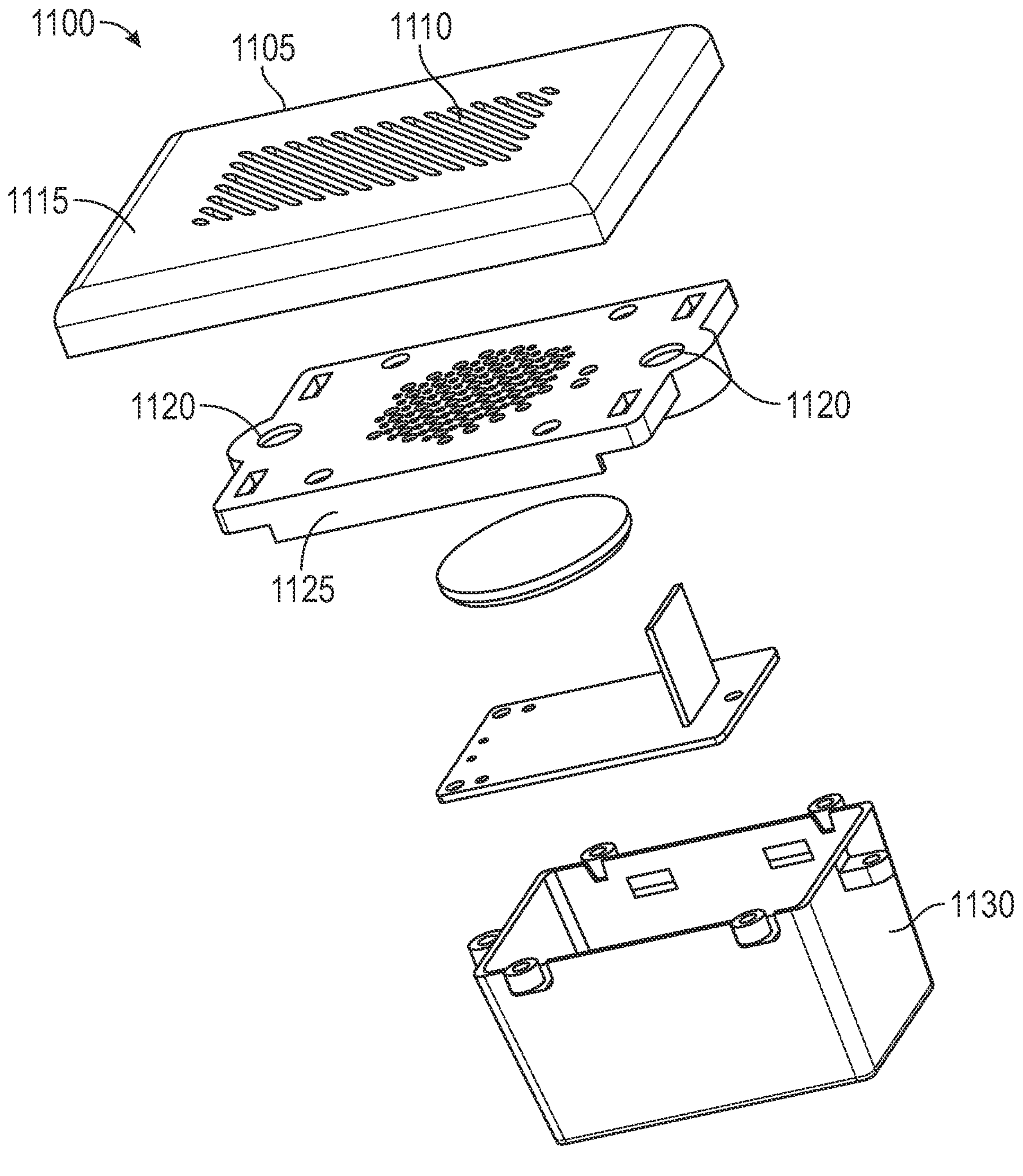
FIG. 11 provides an exploded view of an electronic door chime configured to fit in a single-gang box, in accordance with aspects of the embodiments.

In certain embodiments, the chime system can be configured as a wireless chime 1100 as illustrated in FIG. 11. FIG. 11 illustrates a disassembled view of a door chime and housing system 1100 configured to be installed in a single gang box, in accordance with the disclosed embodiment. Aspects of the embodiment can include some or all features of other embodiments disclosed herein. In certain embodiments, the door chime and housing system 1100 can comprise a high power, smart doorbell compatible system.

The door chime housing includes a front cover 1105, with grate 1110 in the front face 1115 to allow sound to exit the housing. A middle plate 1130 which can connect to the front cover with tab snaps, further includes two screw holes 1120 that allow a screw to connect the middle plate 1130 to the remainder of the housing and/or the box. The middle plate 1130 can be screwed into a wiring box, and the faceplate 1115 snaps on middle plate 1130 to provide screwless appearance.

A speaker element can be configured to connect to a PCB below the middle plate 1130. The remainder of the housing 1100 includes a bottom cover 1125 configured to house the PCB and speaker element. The front cover 1105 and bottom cover 1125 can be joined together with any fastening means, or can be configured to snap together.

Figure 12A:
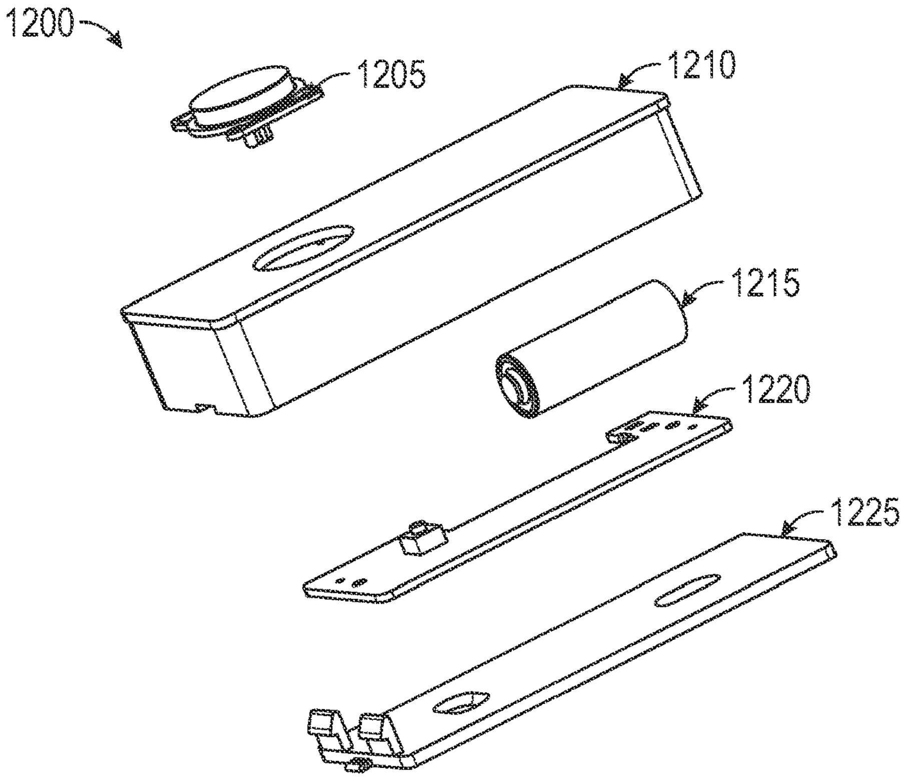
FIG. 12A illustrates a wireless rectangular doorbell button, in accordance with the disclosed embodiments.

The system 1100 can also include a wireless button 1200 with 12V battery which can be configured to provide a signal to the RF receiving module to activate the loudspeaker as illustrated in FIG. 12A. The wireless button can include a door chime key 1205 configured in a housing 1210. A battery 1215 can be configured in the housing to provide power to a PCB 1220. The wireless button can further include a back cover 1225 with two mounting holes. Schematics and details of associated circuits are further detailed herein.

Figure 12B:
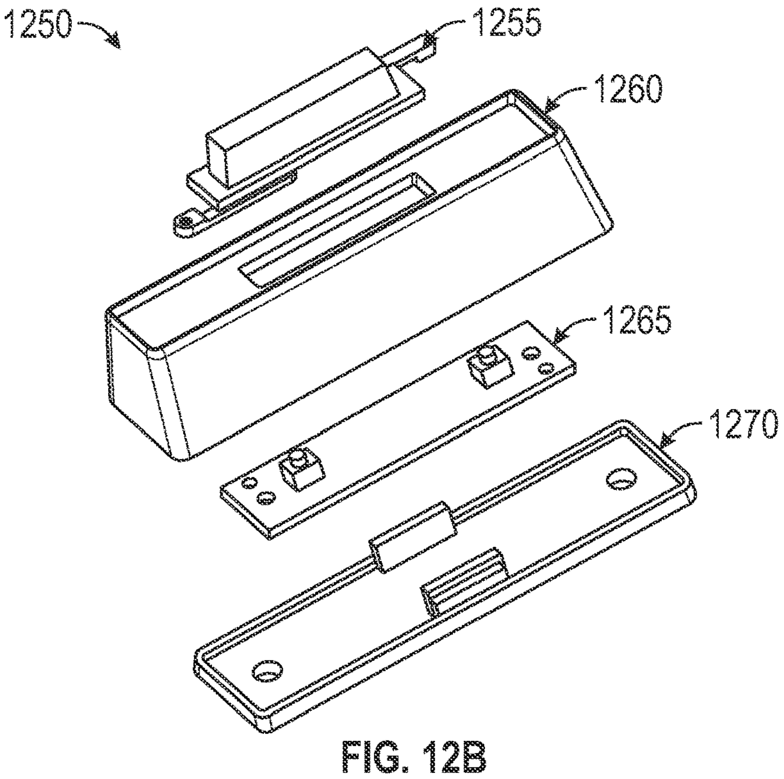
FIG. 12B illustrates a wireless doorbell button, in accordance with the disclosed embodiments.

The system 1100 can also include a wireless button 1250 with 3V battery which can be configured to provide a signal to the RF receiving module to activate the loudspeaker as illustrated in FIG. 12B. The wireless button 1250 can include a door chime key 1255 configured in a key cover 1260 which may serve as a battery housing and is configured to accept the door chime key 1255 and interface with the PCB 1265. A battery can be configured in the housing key cover 1260 to power the circuit on the PCB 1265. The wireless button 1250 can further include a back plate 1270 configured to attaching to the key cover 1260, and can include two mounting holes.

Figure 13A:
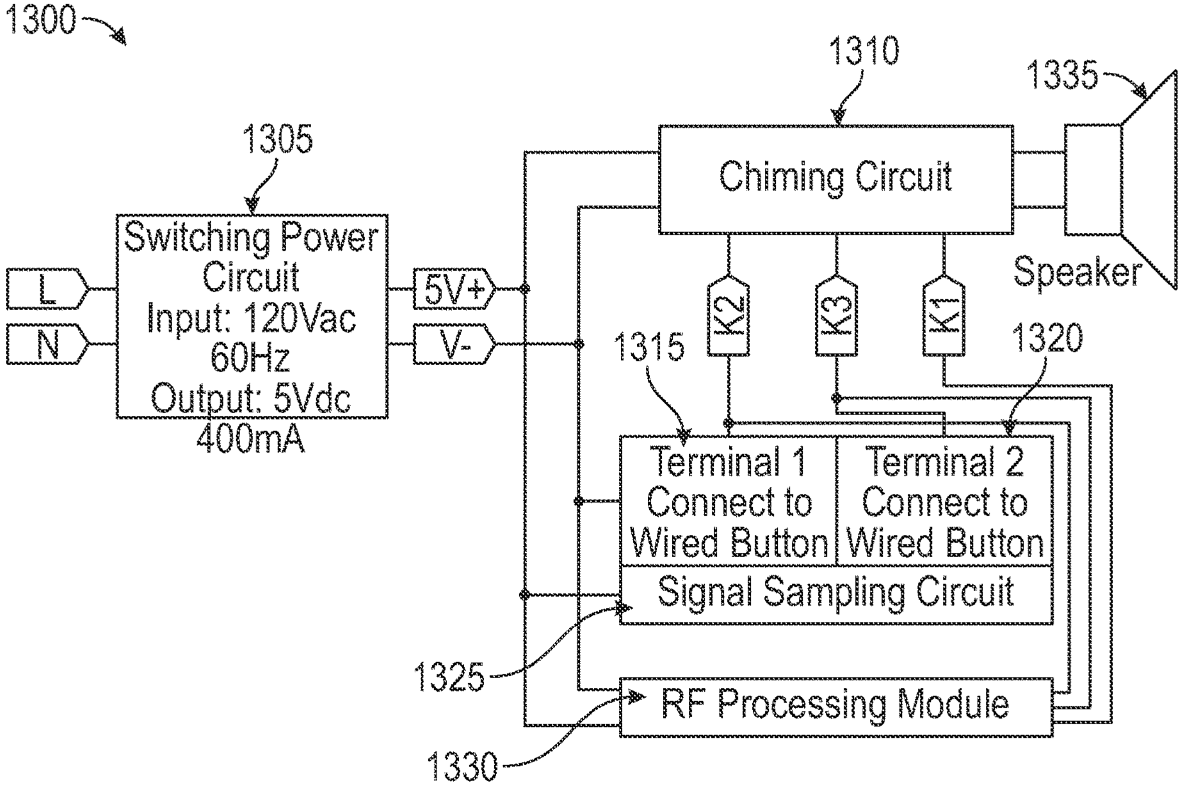
FIG. 13A illustrates a block diagram of a low power wireless electronic door chime configured to fit in a single-gang box, in accordance with aspects of the embodiments.

FIG. 13A illustrates a block diagram of a low power wireless chime kit 1300 configured to fit in a single gang box, in accordance with the disclosed embodiments. In certain embodiments the low power wired chime kit can comprise a 5 W wired chime kit. In other embodiments, other powers are possible. The wireless chime kit 1300 includes a switching power supply circuit 1305 operably connected to a chiming circuit 1310, and two terminals, first terminal 1315 and second terminal 1320. The two terminals 1315 and 1320 connect to the wireless button and the chiming circuit 1310. The switching power supply circuit 1305 is further connected to a signal sampling circuit 1325 and an RF processing module 1330. The chiming circuit 1310 is connected directly to the speaker 1335, such that operation of the wireless button results in an audible sound output by the speaker 1335.

The electronic switching power supply circuit 1305 can have an output of constant 24 VDC power (or other such level), which is more stable. The electronic switching power circuit 1305 also provides additional protection functions including, but not limited to, surge protection and power limiting, as well as providing the doorbell with extra protection.

Thus, the electronic switching power supply circuit has multiple benefits to the doorbell sensor circuit. For example, it offers a more stable and safe current input to the doorbell sensor because the current input is DC instead of DC. The switching power supply protects the doorbell sensor from unexpected surges, where a traditional mechanical transformer doesn't. The switching power supply's output DC current is an impulse current due to its switching on/off working mode, the impulse DC current helps improve the doorbell sensor's temperature and life. In addition, it adds a level of safety for unusual circumstances, for example, when the doorbell's button is pressed or held for long time without being released to its normal open position.

Figure 13B:
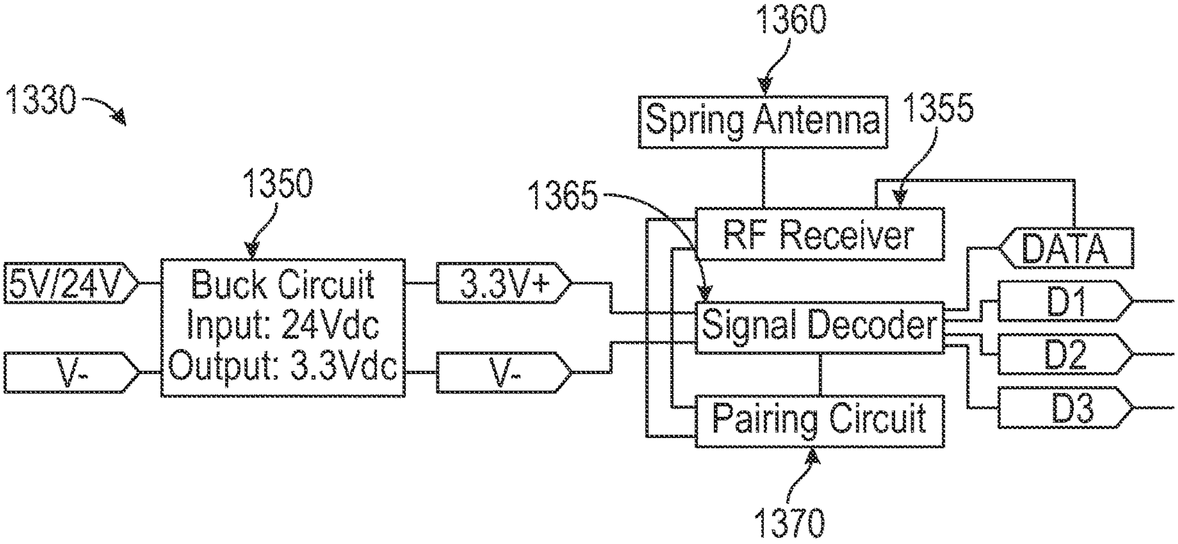
FIG. 13B illustrates a block diagram of an RF processing module, in accordance with aspects of the embodiments.

FIG. 13B illustrates a block diagram illustrating aspects of the RF processing module 1330. It should be appreciated that the configuration can be used with either a low power or a high power wireless chime, as further detailed herein. The processing module 1330 can comprise a buck circuit 1350 connected to an RF receiver 1355 and spring antenna 1360. The buck circuit 1350 can be further connected to a signal decoder 1365. The signal decoder 1365 is connected to a pair circuit 1370 with is connected back to the RF receiver 1355.

Figure 14:
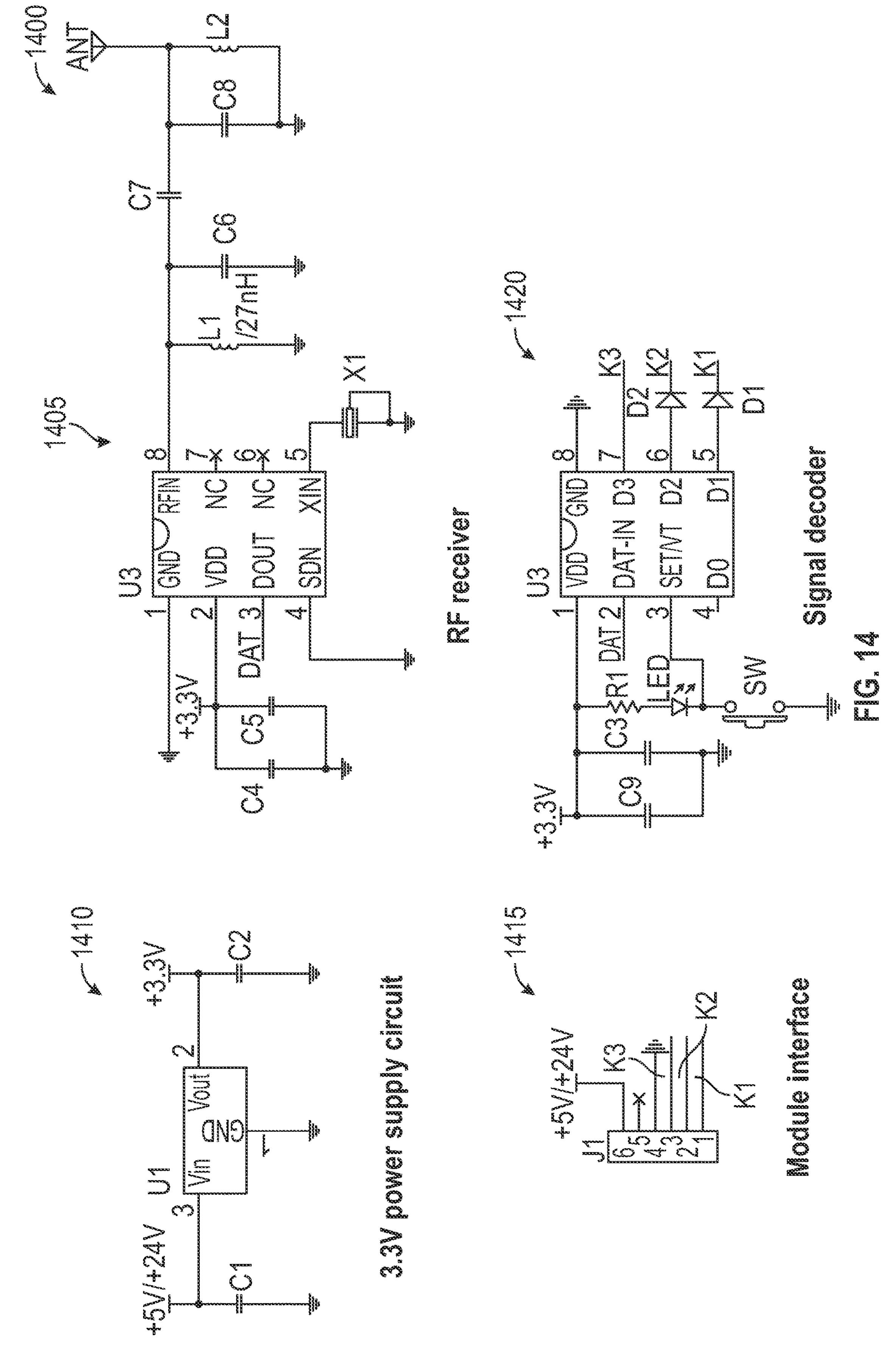
FIG. 14 illustrates a circuit schematic of an RF processing module, in accordance with aspects of the embodiments.

FIG. 14 illustrates aspects of circuit assembly 1400 for the RF processing module 1330 in accordance with the disclosed embodiments. It should be understood this circuit assembly can be similarly used for a low power or high power wireless configuration in certain embodiments. The circuits 1400 can an RF receiver 1405, power supply circuit 1410, module interface 1415, and signal decoder 1420.

Figure 15A:
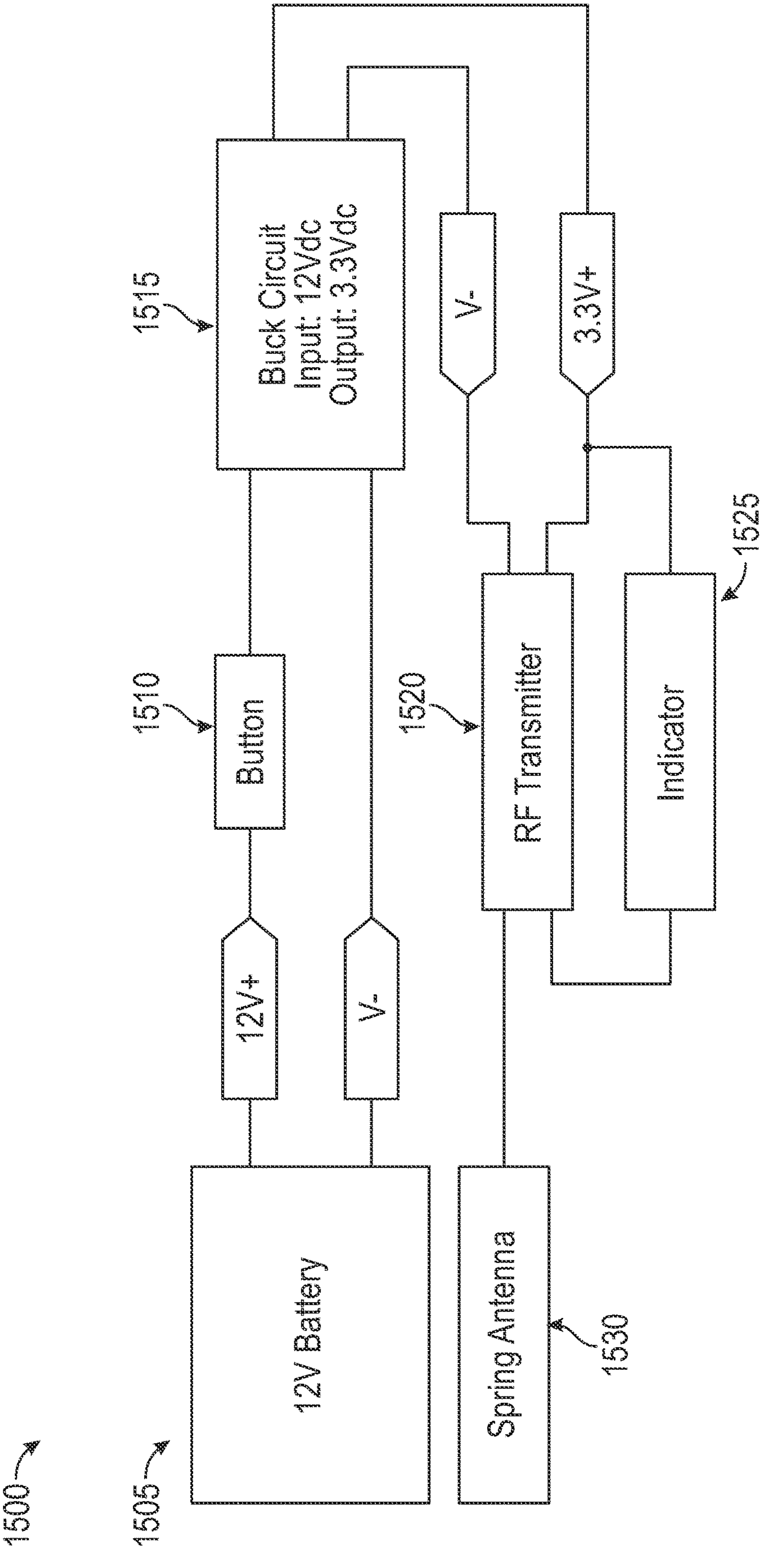
FIG. 15A illustrates a block diagram of a wireless button with 12V battery, in accordance with the disclosed embodiments.

FIG. 15A illustrates a block diagram of a wireless button. It should be appreciated that this block diagram can be used with a low power or high power system. The wireless button 1500, requires a battery 1505 which is connected to a button 1510 and buck circuit 1515. The buck circuit is connected to an RF transmitter 1520 which include an indicator 1525. An antenna 1530 can be connected to the RF transmitter.

Figure 15B:
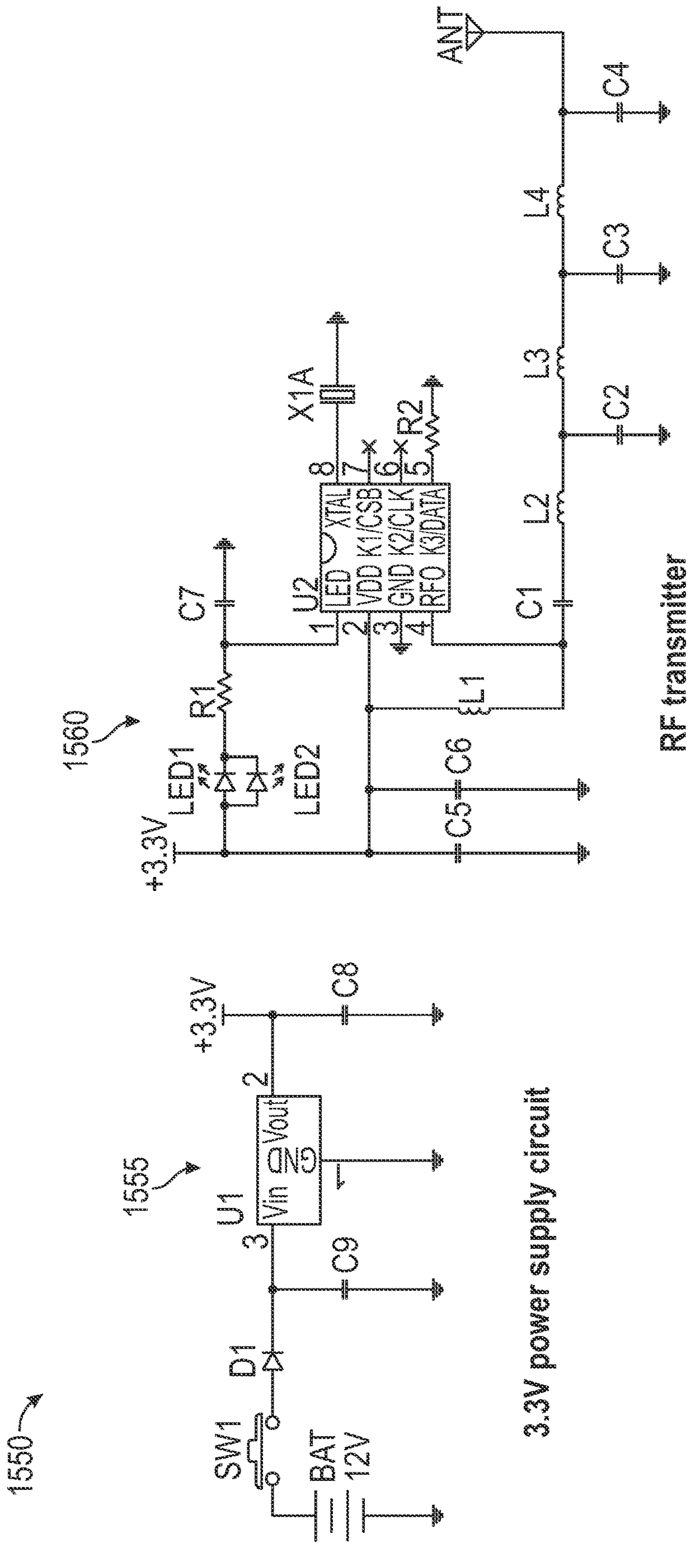
FIG. 15B illustrates circuit schematics of a wireless button with 12V battery, in accordance with the disclosed embodiments.

FIG. 15B illustrates a circuit assembly 1550 for a low power or high power wireless button. The circuit assembly 1550 can comprise a power supply circuit 1555 and an RF Transmitter 1560.

Figure 16A:
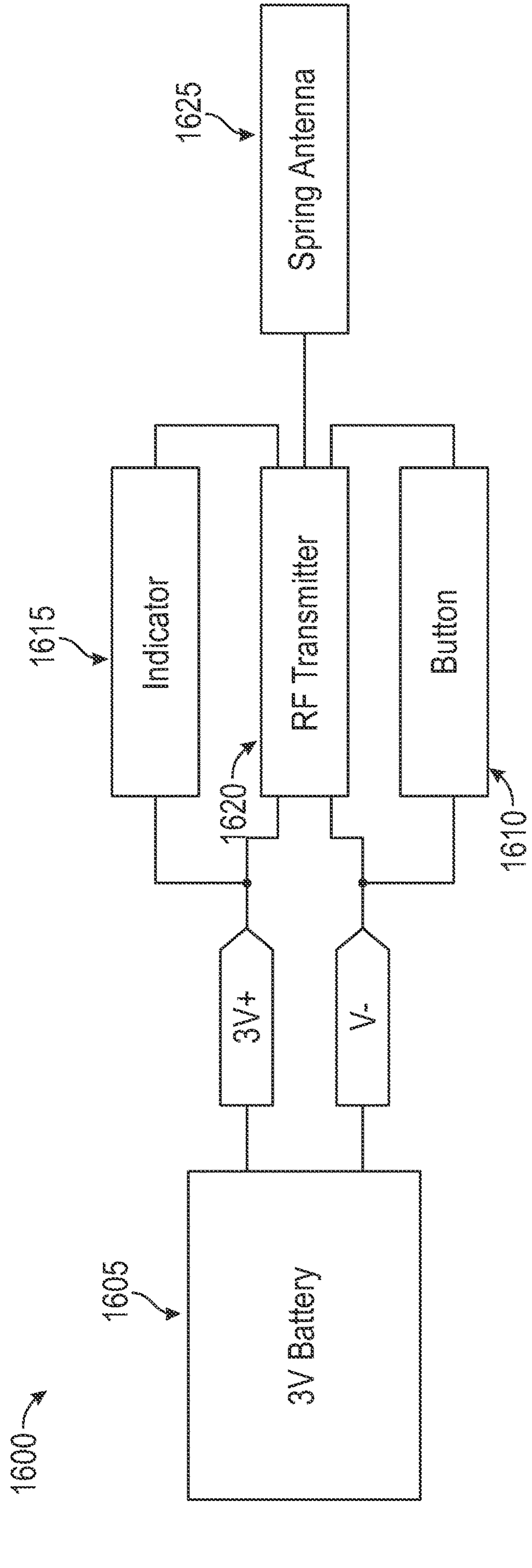
FIG. 16A illustrates a block diagram of a wireless button with 3V battery, in accordance with the disclosed embodiments.

FIG. 16A illustrates a block diagram of an alternative wireless button. It should be appreciated that this block diagram can be used with a low power or high power system. The wireless button 1600, requires a battery 1605 which is connected to a button 1610 and indicator 1615, both of which connect to an RF transmitter 1620. An antenna 1625 can be connected to the RF transmitter 1620.

Figure 16B:
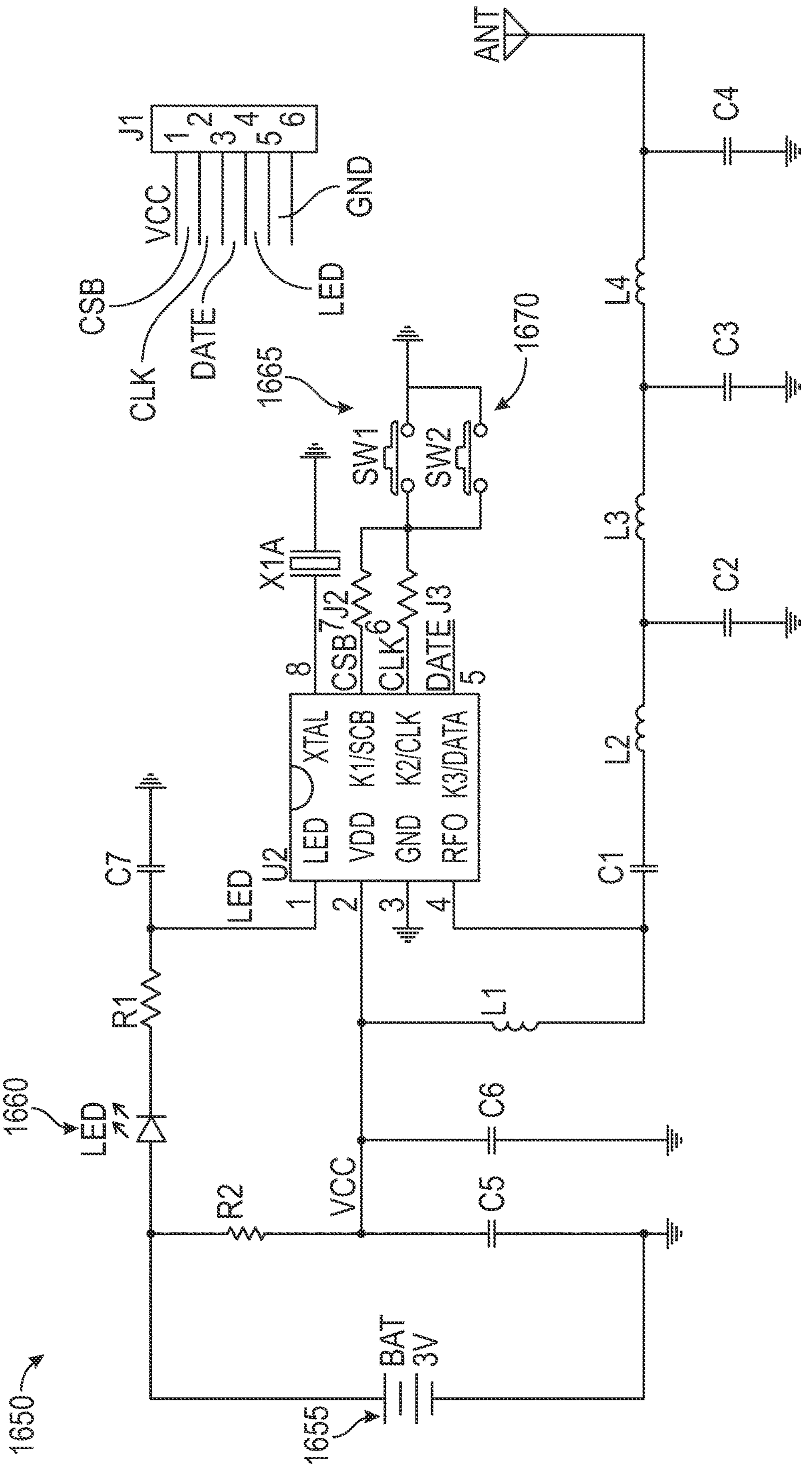
FIG. 16B illustrates circuit schematics of a wireless button with 3V battery, in accordance with the disclosed embodiments.

FIG. 16B illustrates a circuit assembly 1650 for the alternative low power or high power wireless button. The circuit assembly 1650 can comprise a battery 1655 an indicator 1660. Multiple switch can be provided including first switch 1665 and second switch 1670.

Figure 17:
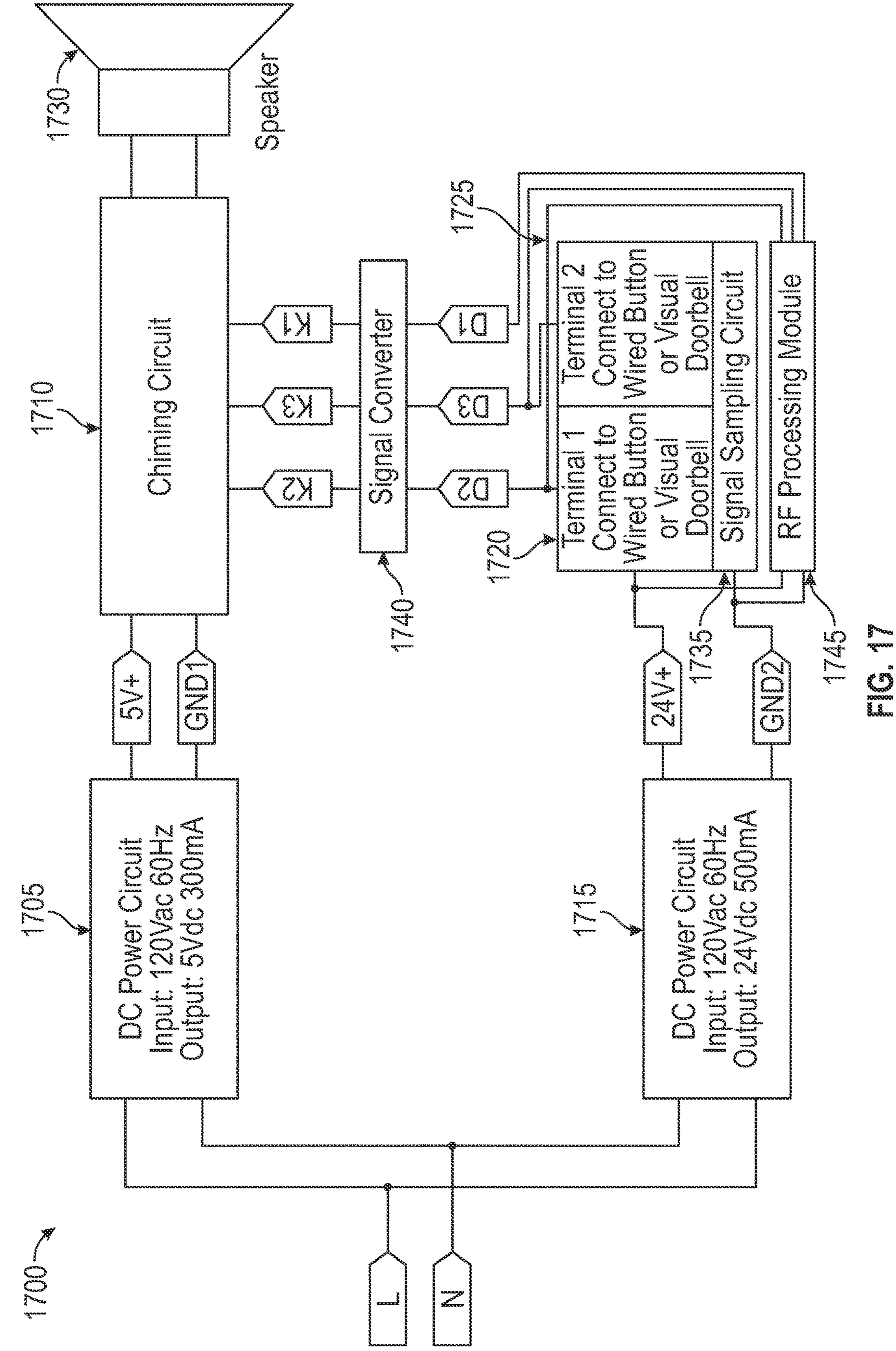
FIG. 17 illustrates a block diagram of a wireless high power electronic door chime, in accordance with aspects of the embodiments.

FIG. 17 illustrates a block diagram of a high power wireless chime kit 1700 most commonly associated with a video doorbell, in accordance with the disclosed embodiments. The wireless chime kit 1700 includes a first DC power circuit 1705 operably connected to a chiming circuit 1710. The chiming circuit 1710 is connected directly to the speaker 1730, such that operation of the wired bottoms results in an audible sound output by the speaker 1730.

The chime kit 1700 further includes a second DC power circuit 1715 connected to two terminals, first terminal 1720 and second terminal 1725. The two terminals 1720 and 1725 connect to the wireless button of a visual doorbell. The DC power circuit 1715 is further connected to a signal sampling circuit 1735 and RF processing module 1745. A signal converter 1740 connects the first terminal 1720 to the chiming circuit 1710 and the second terminal 1725 to the chiming circuit 1710.

In certain embodiments, a method for producing a chime with a doorbell button is disclosed. The method comprises attaching a power supply to a back cover, the power supply configured to receive mains electric power and to produce a DC output, attaching a first circuit powered by the AC input to the back cover, the first circuit comprising a power section, a doorbell interface, a doorbell sensor, and a chiming circuit, forming a housing by attaching a front cover to the back cover, the back cover comprising a separation board, and the housing configured for installation in a single-gang voltage box, receiving a doorbell trigger signal, sending a trigger sensed signal to the chiming circuit in response to receiving the doorbell trigger signal, and producing a sound wherein the chiming circuit sends a sound signal to a speaker held between the front cover and the first circuit to thereby cause the speaker to produce sounds. The method can comprise attaching a faceplate to the front cover, the faceplate configured to cover the housing when the housing is installed in the single-gang voltage box.

Figure 18:
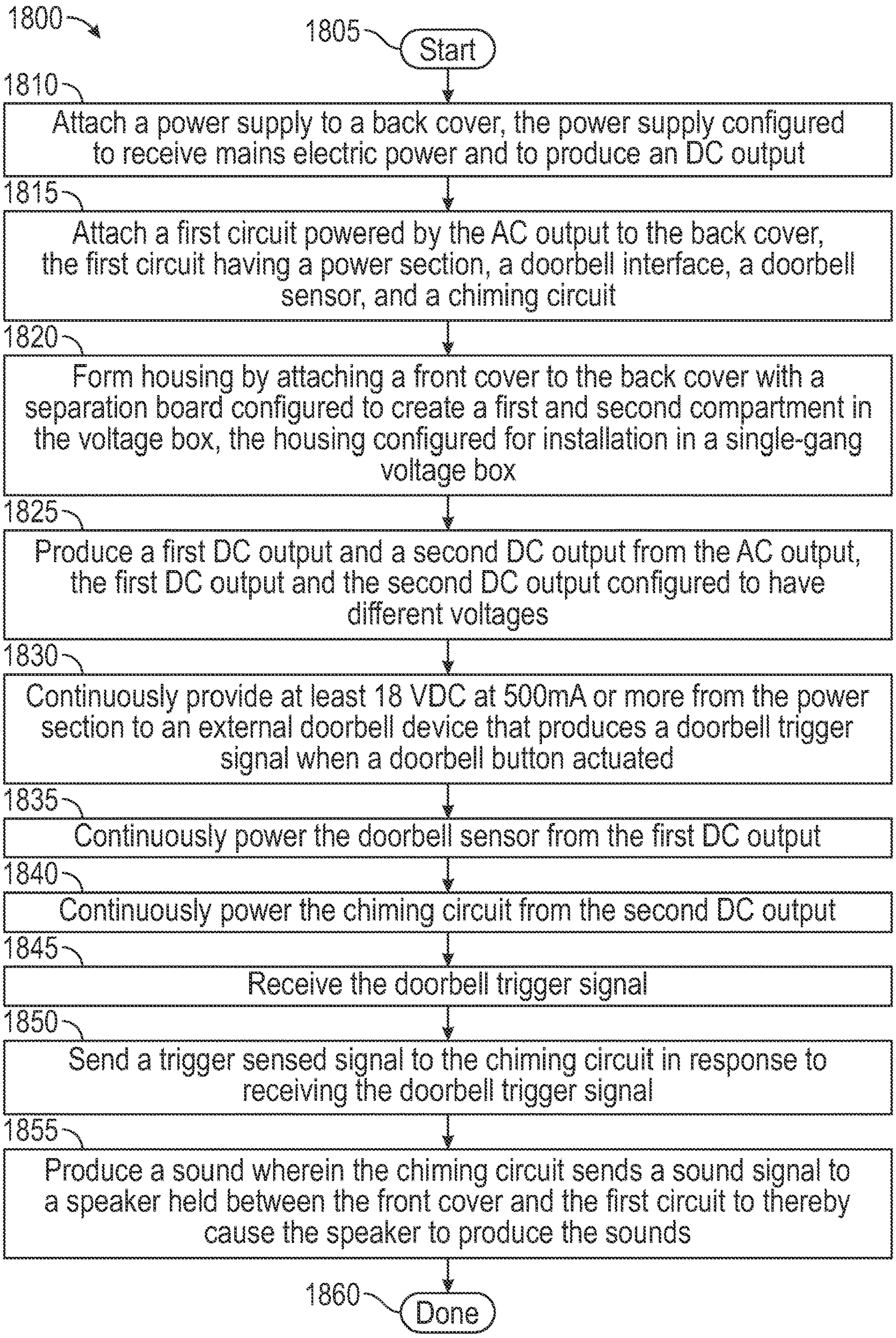
FIG. 18 illustrates a method for safely configuring a door chime in a single-gang box, in accordance with the disclosed embodiments.

FIG. 18 illustrates steps associated with such a method 1800 in accordance with the disclosed embodiments. The method 1800 illustrates configuration and use of an electronic door chime as disclosed herein. The methods starts at 1805.

At step 1810, a power supply can be attached to the back cover. The power supply is configured to receive mains electric power and to produce a DC power output. Next at step 1815, a first circuit powered by AC output can be attached to the back circuit. The first circuit can have a power section, doorbell interface, doorbell sensor, and a chiming circuit.

At step 1820, a housing is formed by attaching the front cover to the back cover. The back cover has a compartment, as well as a separation board configured to separate the voltage box. The power supply is isolated, by the separation board, from low voltage components. The housing is ready for installation in a single-gang voltage box.

Now, at 1825 a first DC output and a second DC output are produced from the AC input. The first DC output and the second DC output are at different voltages. An external doorbell device (e.g., a doorbell button) is continuously provided power from the power section, with at least 18 VDC at 500 mA or more at step 1830. The external doorbell device produces a doorbell trigger signal when a doorbell button is actuated. Likewise, at 1835, the doorbell sensor is continuously powered by the first DC output. The chiming circuit is continuously powered from the second DC output at step 1840.

In response to receiving the doorbell trigger signal at step 1845, a trigger sensed signal is sent to the chiming circuit at step 1850. An audible sound is produced by a speaker connected to the chiming circuit because the chiming circuit sends a sound signal to the speaker in response to receiving the trigger sensed signal as illustrated at 1855. The method ends at 1860.

As such, in certain embodiments the method comprises attaching a power supply to a back cover, the power supply configured to receive mains electric power and to produce an DC output, attaching a first circuit to the back cover, the first circuit comprising a power section, a doorbell interface, a doorbell sensor, and a chiming circuit, forming a housing by attaching a front cover to the back cover, the back cover comprising a separation board, and the housing configured for installation in a single-gang voltage box receiving a doorbell trigger signal, sending a trigger sensed signal to the chiming circuit in response to receiving the doorbell trigger signal, and producing a sound wherein the chiming circuit sends a sound signal to a speaker held between the front cover and the first circuit to thereby cause the speaker to produce sounds. The method can further comprise attaching a faceplate to the front cover, the faceplate configured to cover the housing when the housing is installed in the single gang voltage box. The method can further comprise producing a rectified output, powering a light emitting diode from the rectified output only when a switch is open, and producing the doorbell trigger signal when the switch is closed. The method can further comprise producing a rectified output, powering a light emitting diode from the rectified output only when a switch is closed, and producing the doorbell trigger signal when the switch is closed.

Figure 19A:
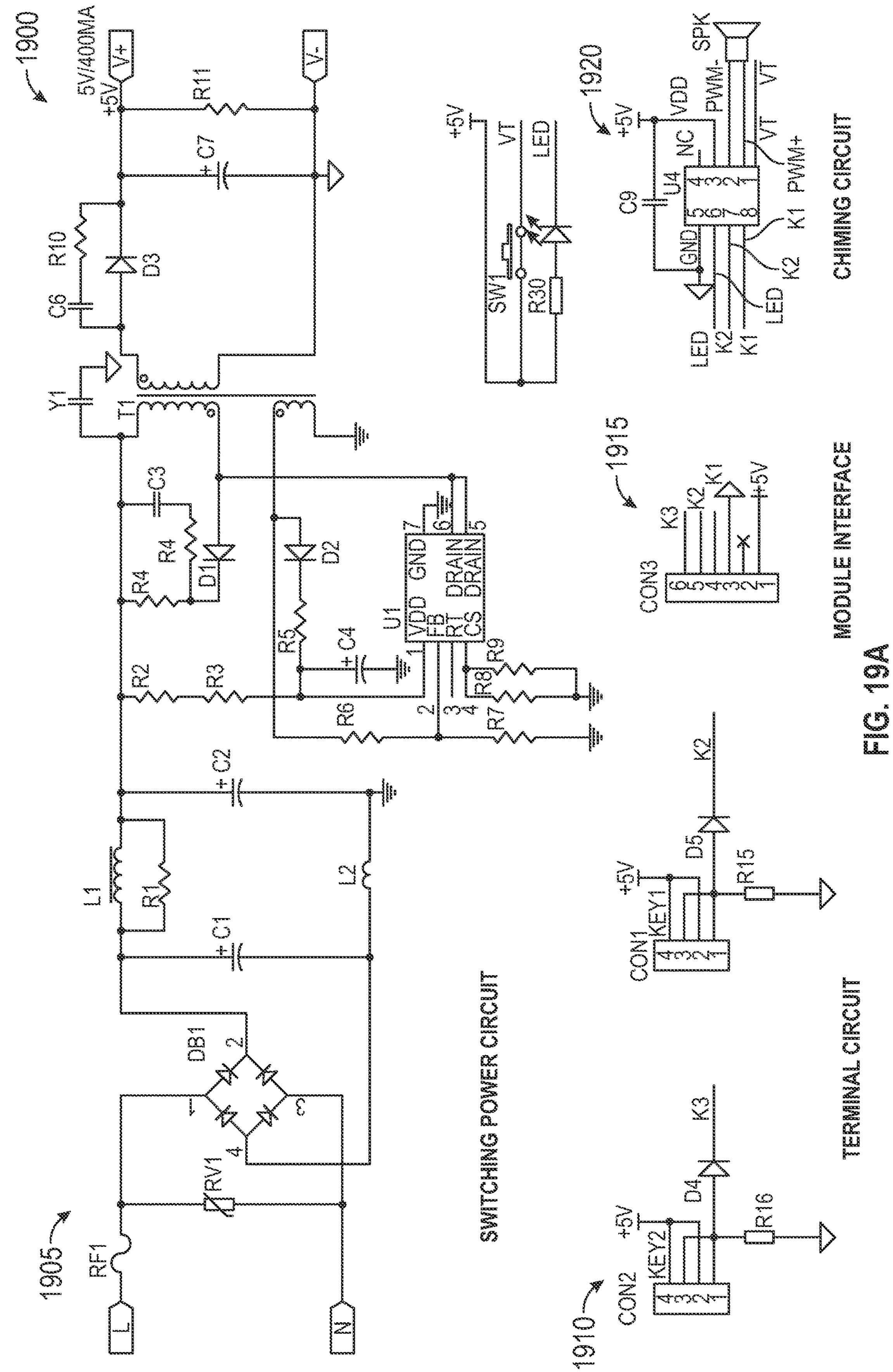
FIG. 19A illustrates a circuit schematic of a low power electronic door chime configured with a melody selection function and configured to fit in a single-gang box, in accordance with aspects of the embodiments.

FIG. 19A illustrates a low power circuit assembly 1900 that can be used in certain embodiments, in place of the circuit assembly 600. The circuit assembly 1900 provides a melody selection function, so that the melody associated with the chime can be selected from several options. The circuit assembly 1900 includes a switching power circuit 1905, a terminal circuit 1910, a module interface 1915, and a chiming circuit 1920.

Figure 19B:
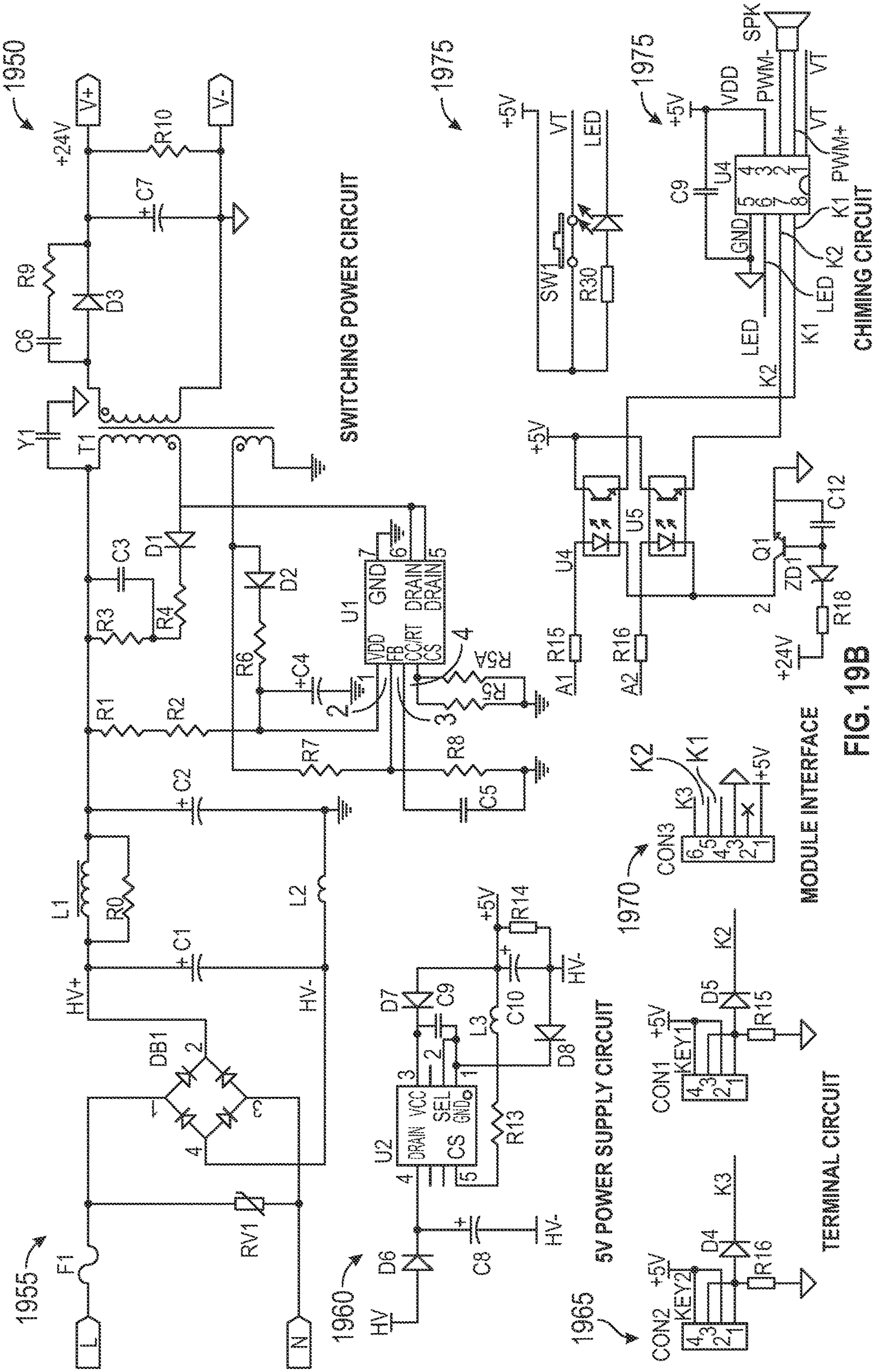
FIG. 19B illustrates a circuit schematic of a high power electronic door chime configured with a melody selection function and configured to fit in a single-gang box, in accordance with aspects of the embodiments.

FIG. 19B illustrates a high power circuit assembly 1950 that can be used in certain embodiments, in place of the circuit assembly 900. The circuit assembly 1950 provides a melody selection function, so that the melody associated with the chime can be selected from several options. The circuit assembly 1950 includes a switching power circuit 1955, a 5V power supply circuit 1960, a terminal circuit 1965, a module interface 1970, and a chiming circuit 1975.

Figure 20:
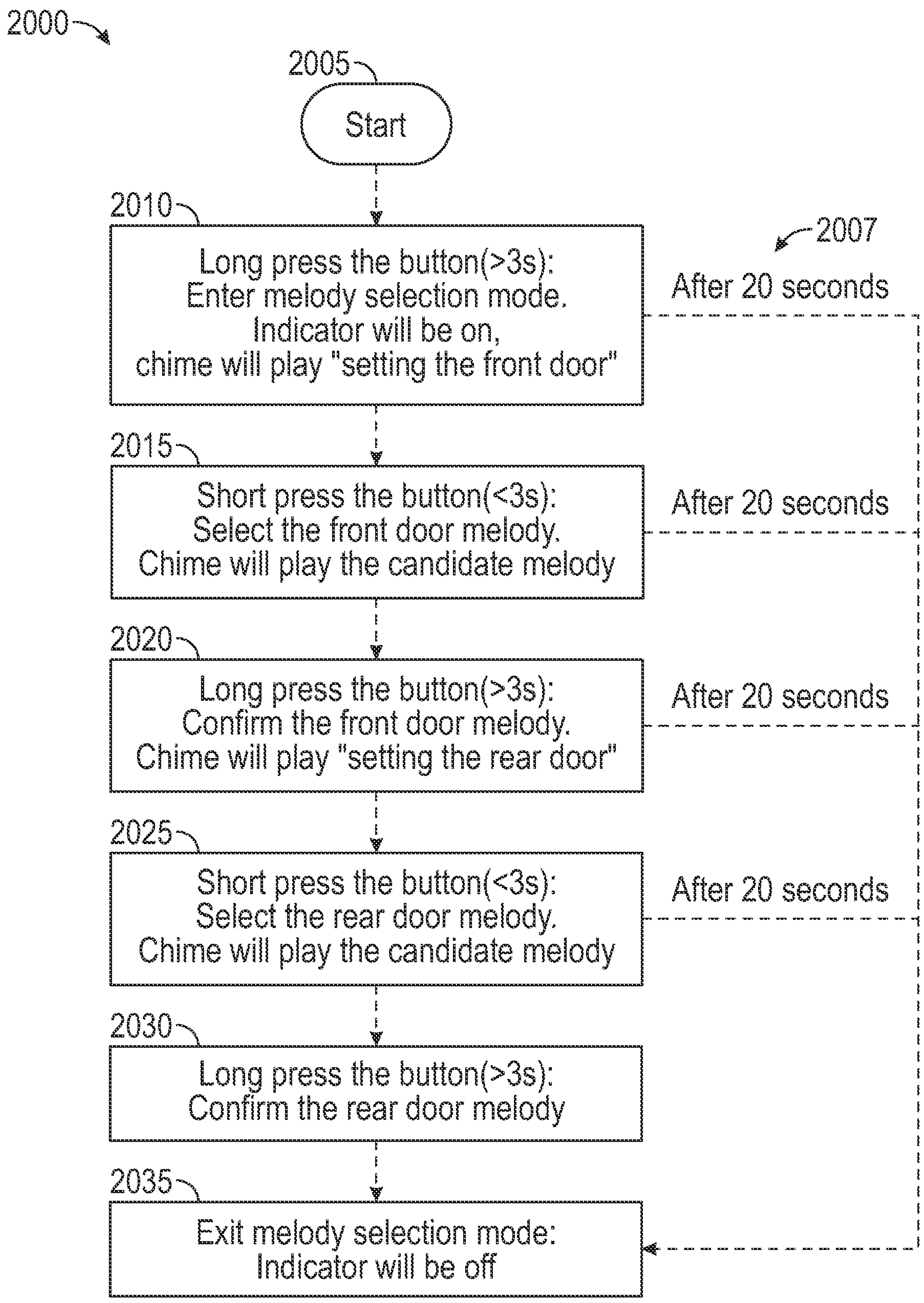
FIG. 20 illustrates a method for selecting a melody of a door chime in a single-gang box, in accordance with the disclosed embodiments.

FIG. 20, illustrates steps associated with a method 2000, associated with the steps for selecting a melody in accordance with circuit assembly 1900 or circuit assembly 1950, in combination with other systems and methods disclosed herein. The method begins at 2005.

At step 2010, a button associated with the circuit can be pressed and held for more than 3 seconds. This will enter the melody selection mode. An associated indicator light will appear on and a chime will play. The chime can include an audio queue indicating the mode is for setting the chime melody for the front door. As illustrated by dotted line 2007 if any of the subsequent steps are not taken within a given amount of time, the system exits the melody selection mode at step 2035 and the method ends.

If, within 20 seconds, the button is pressed again, this time with a short press of less than 3 seconds, the system will cycle through available chime melodies as shown at step 2015. With each short press a new candidate melody is played.

Once a candidate melody is selected as the desired melody for the front door, within 20 seconds of the chime for that melody playing, the melody can be confirmed with a long press of greater than 3 seconds as shown at step 2020. If a second doorbell is available, the system will immediately proceed to the identical procedure for setting the second door melody. An audio queue can prompt that the mode is for setting the chime melody for the second door.

At step 2025, short button presses of less than three seconds can cycle through candidate second door melodies. With each short press the chime will play the candidate melody for the second door. Once a candidate melody is selected as the desired melody for the second door, within 20 seconds of the chime for that melody playing, the melody can be confirmed with a long press of greater than 3 seconds as shown at step 2030.

Both the front door and second door melodies have been set at step 2035. The indicator light turns off and the system exits the melody selection mode.

The embodiments disclosed herein can meet safety standards and be compatible with doorbells. For example, the embodiments can safely powered doorbells and can be configured in a single gang box, while also being compatible with simple push button doorbell devices. The embodiments can also safely provide continuous power to smart doorbells, also called IOT doorbells, to drive the camaras, audio interface and other components within the smart doorbell. The embodiments are configured to meet safety standards and can be configured in a single gang box. The disclosed systems include a separation board, to comply with UL voltage separation requirements, and the disclosed embodiments can fit into standard single gang box flush to a wall.

It will be appreciated that variations of the above-disclosed and other features and functions, or alternatives thereof, may be desirably combined into many other different systems or applications.

For example, in an embodiment, an electronic door chime comprises a back cover comprising a first compartment, a front cover attached to the back cover to thereby form a housing configured for installation in a voltage box, a separation board affixed to the back cover, a power supply, the power supply configured to receive mains electric power and to produce a DC output, a first circuit disposed in the housing, the first circuit comprising a power section, and a chiming circuit, and a speaker operably connected to the chiming circuit.

In an embodiment, the doorbell sensor is configured to receive a doorbell trigger signal and to produce a trigger sensed signal upon receiving the doorbell trigger signal. In an embodiment, the chiming circuit sends a sound signal to the speaker upon receiving the trigger sensed signal to thereby cause the speaker to produce a sound. In an embodiment, the voltage box is a single-gang voltage box. In an embodiment, the separation board affixed to the housing is configured to separate the single gang box into a first compartment and a second compartment. In an embodiment, the power supply is a switching power supply circuit. In an embodiment, the electronic door chime further comprises a doorbell button, the doorbell button comprising a switch, and an indicator configured to light only when the switch is open. In an embodiment, a light emitting diode configured to light only when the switch is closed.

In another embodiment, a door chime comprises a housing configured for installation in a voltage box, a separation board affixed to the housing configured to separate a single gang voltage box into a first compartment and second compartment, a power supply, the power supply configured to receive mains electric power and to produce a DC output, a chiming circuit disposed in the housing, and a speaker disposed in the housing and operably connected to the chiming circuit. In an embodiment, the chiming circuit sends a sound signal to the speaker upon receiving a trigger sensed signal to thereby cause the speaker to produce a sound. In an embodiment, the separation board further comprises at least one breaking score. In an embodiment, the at least one breaking score is configured to allow the separation board to fit in the voltage box. In an embodiment, the first compartment accepts input lines. In an embodiment, the door chime further comprises an external doorbell button, the external doorbell button comprising a switch, and an indicator configured to light when the switch is open.

In another embodiment, a method comprises attaching a power supply to a back cover, the power supply configured to receive mains electric power and to produce an DC output, attaching a first circuit to the back cover, the first circuit comprising a power section, a doorbell interface, a doorbell sensor, and a chiming circuit, forming a housing by attaching a front cover to the back cover, the back cover comprising a separation board, and the housing configured for installation in a single-gang voltage box, receiving a doorbell trigger signal, sending a trigger sensed signal to the chiming circuit in response to receiving the doorbell trigger signal; and producing a sound wherein the chiming circuit sends a sound signal to a speaker held between the front cover and the first circuit to thereby cause the speaker to produce sounds. In an embodiment, the method comprises attaching a faceplate to the front cover, the faceplate configured to cover the housing when the housing is installed in the single gang voltage box. In an embodiment, the method comprises producing a rectified output, powering a light emitting diode from the rectified output only when a switch is open and producing the doorbell trigger signal when the switch is closed. In an embodiment, the method comprises producing a rectified output, powering a light emitting diode from the rectified output only when a switch is closed and producing the doorbell trigger signal when the switch is closed.

It will also be appreciated that various presently unforeseen or unanticipated alternatives, modifications, variations, or improvements therein may be subsequently made by those skilled in the art which are also intended to be encompassed by the following claims.

What is claimed is:

1. An electronic door chime comprising:

a back cover comprising a first compartment;

a front cover attached to the back cover to thereby form a housing configured for installation in a voltage box, wherein the housing occupies a portion of the voltage box;

a separation board affixed to the back cover and extending away from the back cover, the separation board separating a portion of the voltage box not occupied by the housing into an AC input side of the voltage box behind the housing and an output side of the voltage box behind the housing;

a power supply, the power supply configured to receive mains electric power and to produce a DC output;

a first circuit disposed in the housing, the first circuit comprising a power section, and a chiming circuit; and a speaker operably connected to the chiming circuit.

2. The electronic door chime of claim 1 wherein the first circuit comprises a doorbell sensor configured to receive a doorbell trigger signal and to produce a trigger sensed signal upon receiving the doorbell trigger signal.

3. The electronic door chime of claim 2 wherein the chiming circuit sends a sound signal to the speaker upon receiving the trigger sensed signal to thereby cause the speaker to produce a sound.

4. The electronic door chime of claim 1 wherein the voltage box is a single-gang voltage box.

5. The electronic door chime of claim 4 wherein the separation board affixed to the housing is configured to separate the single- gang voltage box and wherein the separation board further comprises at least one breaking score for removing a portion of the separation board so that it fits in the single-gang voltage box behind the housing.

6. The electronic door chime of claim 1 wherein the first circuit further comprises:

an electronic switching power supply circuit configured to supply no more than 24 VDC power.

7. The electronic door chime of claim 1 wherein the power supply is a switching power supply circuit.

8. The electronic door chime of claim 1 further comprising a doorbell button, the doorbell button comprising a switch, and an indicator configured to light only when the switch is open.

9. The electronic door chime of claim 8 further comprising a light emitting diode configured to light only when the switch is closed.

10. A door chime comprising:

a housing configured for installation in a single gang voltage box;

a separation board affixed to the housing and extending away from a back of the housing, the separation board separating a portion of the single gang voltage box not occupied by the housing into an AC input side of the single gang voltage box behind the housing and an output side of the single gang voltage box behind the housing;

a power supply, the power supply configured to receive mains electric power and to produce a DC output;

a chiming circuit disposed in the housing; and a speaker disposed in the housing and operably connected to the chiming circuit.

11. The door chime of claim 10 wherein the chiming circuit sends a sound signal to the speaker upon receiving a trigger sensed signal to thereby cause the speaker to produce a sound.

12. The door chime of claim 10 wherein the separation board further comprises at least one breaking score.

13. The door chime of claim 12 wherein the at least one breaking score is configured to allow the separation board to fit in the voltage box.

14. The door chime of claim 12 wherein the separation board is compliant with UL94 fire retardant standards.

15. The door chime of claim 10 wherein the AC input side of the single gang voltage box is configured to accept input lines, and the output side of the single gang voltage box behind the housing is configured to accept output lines.

16. The door chime of claim 10 further comprising:

an external doorbell button, the external doorbell button comprising a switch, and an indicator configured to light when the switch is open.

17. A method comprising:

attaching a power supply to a back cover, the power supply configured to receive mains electric power and to produce an DC output;

attaching a first circuit to the back cover, the first circuit comprising a power section, a doorbell interface, a doorbell sensor, and a chiming circuit;

forming a housing by attaching a front cover to the back cover, the back cover comprising a separation board extending away from a back of the housing, the housing configured for installation in a single-gang voltage box, the separation board separating a portion of the single gang voltage box not occupied by the housing into an AC input side of the single gang voltage box behind the housing, and an output side of the single gang voltage box behind the housing;

receiving a doorbell trigger signal;

sending a trigger sensed signal to the chiming circuit in response to receiving the doorbell trigger signal; and producing a sound wherein the chiming circuit sends a sound signal to a speaker held between the front cover and the first circuit to thereby cause the speaker to produce sounds.

18. The method of claim 17 further comprising attaching a faceplate to the front cover, the faceplate configured to cover the housing when the housing is installed in the single-gang voltage box.

19. The method of claim 17 further comprising:

producing a rectified output;

powering a light emitting diode from the rectified output only when a switch is open; and producing the doorbell trigger signal when the switch is closed.

20. The method of claim 17 further comprising:

producing a rectified output;

powering a light emitting diode from the rectified output only when a switch is closed; and producing the doorbell trigger signal when the switch is closed.

* * * * *